(12) United States Patent
Yan et al.

(10) Patent No.: US 9,809,725 B2
(45) Date of Patent: *Nov. 7, 2017

(54) PAINT WITH ENCAPSULATED SOLID PARTICLES

(71) Applicant: Appvion, Inc., Appleton, WI (US)

(72) Inventors: Nianxi Yan, Appleton, WI (US); John Charles Debraal, Appleton, WI (US)

(73) Assignee: Encapsys, LLC, Appleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/307,171

(22) Filed: Jun. 17, 2014

(65) Prior Publication Data

US 2014/0371343 A1 Dec. 18, 2014

Related U.S. Application Data

(63) Continuation-in-part of application No. 14/136,663, filed on Dec. 20, 2013.

(60) Provisional application No. 61/836,017, filed on Jun. 17, 2013.

(51) Int. Cl.

| | |
|---|---|
| *C08K 9/10* | (2006.01) |
| *C09D 7/12* | (2006.01) |
| *C09D 175/04* | (2006.01) |
| *C09D 163/00* | (2006.01) |
| *C09D 133/12* | (2006.01) |
| *C09C 1/36* | (2006.01) |
| *C09C 1/00* | (2006.01) |
| *C08L 61/24* | (2006.01) |
| *C08L 61/28* | (2006.01) |

(52) U.S. Cl.
CPC .......... *C09D 175/04* (2013.01); *C09C 1/0084* (2013.01); *C09C 1/3676* (2013.01); *C09D 7/1225* (2013.01); *C09D 133/12* (2013.01); *C09D 163/00* (2013.01); *C01P 2006/62* (2013.01); *C01P 2006/63* (2013.01); *C01P 2006/64* (2013.01); *C08K 9/10* (2013.01); *C08L 61/24* (2013.01); *C08L 61/28* (2013.01); *C08L 2205/22* (2013.01)

(58) Field of Classification Search
CPC ............................... C08K 9/10; C09D 7/1225
See application file for complete search history.

(56) References Cited

U.S. PATENT DOCUMENTS

| | | | |
|---|---|---|---|
| 3,133,893 A | 5/1964 | Newman | |
| 4,771,086 A | 9/1988 | Martin | |
| 6,528,318 B1 * | 3/2003 | Miragliotta et al. | 436/56 |
| 7,960,026 B2 | 6/2011 | Koller et al. | |
| 2014/0370271 A1 * | 12/2014 | Yan | C09C 1/3676 428/327 |

FOREIGN PATENT DOCUMENTS

WO    WO 9312183 A1 *  6/1993

* cited by examiner

*Primary Examiner* — Vickey Nerangis
(74) *Attorney, Agent, or Firm* — Muncy, Geissler, Olds & Lowe, P.C.

(57) ABSTRACT

A paint composition, which comprises a stanchion-encapsulated pigment such as titanium dioxide, can provide enhanced paint quality with reduced cost.

8 Claims, 20 Drawing Sheets

PAINT WITH ENCAPSULATED SOLID PARTICLES

CROSS-REFERENCE TO RELATED APPLICATIONS

This application is a Continuation-in-Part of co-pending U.S. application Ser. No. 14/136,663 filed on Dec. 20, 2013, for which priority is claimed under 35 U.S.C. §120, and this application claims priority of U.S. Provisional Application No. 61/836,017 filed on Jun. 17, 2013 under 35 U.S.C. §119(e), the entire contents of all of which are hereby incorporated by reference.

FIELD OF DISCLOSURE

The present invention relates to paint compositions that contain an encapsulated pigment such as titanium dioxide.

BACKGROUND

Encapsulated particulate materials are of interest because of their use in many fields. For example, encapsulated particles can be used in coatings, paints, paper, plastic materials, cosmetics, and in numerous other products. The properties of encapsulated particles allow for many beneficial results, such as an increase in the opacity of a material, an increase in the dispersion of the particles, a reduction in the agglomeration of the particles, an improvement of the particles' compatibility with the dispersing medium, and an improvement in the light stability of the particles. Pigments, and titanium dioxide in particular, have many uses. As a pigment, titanium dioxide, for example, is typically used as a powder, that is, as fine particles having a particle size generally in the range of 100 to 500 nm. It is often used in paper making and in paints, where it can increase brightness and opacity, and is also used in textiles, etc. Though commonly available as a powder/pigment, a coated form of titanium dioxide has been suggested.

For example, U.S. Pat. No. 3,133,893 relates to pigment particles coated with a polymer. The coated pigments are used in coloring plastic fibers. The polymer coating is formed by in situ polymerization. By coating the pigment with a polymer coating, the pigment is thought to be susceptible to forming a stable and fine dispersion within a resin or resin solution without the need for extensive milling. The polymer can be formed from any vinyl monomer and generally is identical or compatible with the composition to be pigmented. Acrylonitrile is used mostly in the examples. Examples 3, 6, and 17 use titanium dioxide as the pigment to be coated.

U.S. Pat. No. 4,771,086 relates to polymer coating of pigment particles for use in paint. The process of coating the pigment particles uses otherwise conventional aqueous-based emulsion polymerization, except that the then typical anionic emulsification and stabilizing agent is replaced with a nonionic stabilizing agent that is sufficient to serve as an emulsifying agent. This change in emulsification agent purportedly results in polymerization exclusively on the surface of the pigment particle and forms a uniform thickness of polymer coating thereon. In contrast, the use of conventional anionic emulsification agents is taught to yield essentially bulk polymerization with a mass having a consistency ranging from cottage cheese to lumpy dough to a sticky plastic and which is reportedly not of any practical value. The resulting coated pigment particles are taught to have "extraordinary" stability against flocculation or settling in comparison with conventional latex systems. Also, the coated pigments are taught to be capable of achieving improved covering power and surface gloss. Titanium dioxide is mentioned and exemplified as a useful pigment to be polymer coated.

U.S. Pat. No. 7,960,026 also relates to a coated pigment for use in paint. The coated pigment is formed by first adhering polymer particles onto the surface of the inorganic pigment to form a "Primary Composite Particle." This Primary Composite Particle is then subjected to emulsion polymerization to form a polymer layer around the Primary Coated Polymer. The patentees theorized that the polymer particles attached to the inorganic pigment particle serve as seed polymers to promote formation of the polymer layer around the Primary Coated Polymer during the polymerization step. Titanium dioxide is disclosed and exemplified as an inorganic pigment. The composite particles are taught to provide superior covering/opacity and gloss.

It would be desirable to have a paint composition that could be made at lower cost and have the same or better performance/properties such as any of the hide, gloss, contrast ratio, reflectance, and/or tint strength.

SUMMARY OF THE INVENTION

The present invention relates to the use of a type of polymer coated pigment such as titanium dioxide in a paint composition. Accordingly, a first aspect of the invention relates to a paint composition comprising a liquid carrier, binder, pigment, and additive, wherein the pigment comprises a stanchion-encapsulated pigment such as titanium dioxide. The stanchion-encapsulated pigment is described more fully below. Briefly, such encapsulation refers to the presence of polymer extensions or "stanchions" on the coated pigment particles, which stanchions may link nearby coated particles together. By replacing conventional pigment, in whole or in part, with the stanchion-encapsulate pigment, the amount of pigment, such as titanium dioxide can be reduced but without the expected corresponding reduction in properties.

Further exemplary embodiments of the invention are directed to a paint composition comprised of a particle composition comprising one or more pigment materials and a polymeric coating layer at least partially surrounding the pigment particle; and stanchions for particle to particle bridging extending from the coating layer which further comprises discrete particle separators between the particles of pigment material.

The particles of pigment can be solid particles, and additionally can be any particles that are substantially insoluble in water. For example, the pigment can be made of titanium dioxide, carbon black, mica, silica, calcium carbonate, barium sulfate, zinc oxide, lead oxide, zinc sulfate, iron oxide, talc, clays, kaolinite, montmorillonite, smectite, illite, chlorite and mixtures of any of the foregoing.

The above, as well as additional objectives, features, and advantages of the present invention are detailed in the description below, as well as in the drawings.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
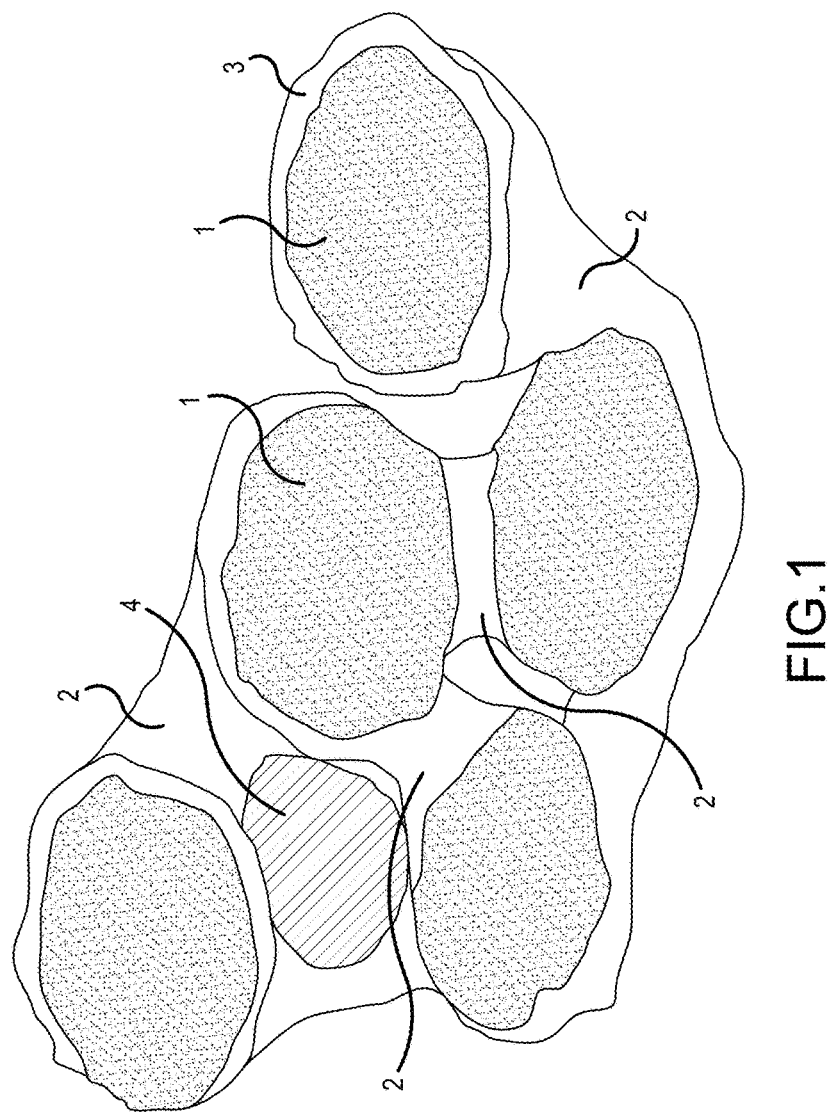
FIGS. 1 and 2 are drawings of a particle composition consistent with the present invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "can include", "includes" and/or "including", when used herein, specify the presence of stated features, integers, steps, operations, elements, and/or components, but do not preclude the presence or addition of one or more other features, integers, steps, operations, elements, components, and/or groups thereof.

The present invention is based on the discovery that stanchion-encapsulated pigment such as titanium dioxide can provide advantages to paint compositions. Paint compositions generally comprise a liquid carrier, a binder portion, a pigment portion, and an additive portion. After application to a substrate, the liquid portion is generally removed by drying and the binder(s) coalesce to form a film having the pigment(s) and additive(s) dispersed therein. A frequent pigment used in paint compositions is titanium dioxide. This pigment provides superior opacity to the paint. But titanium dioxide and other pigments are also relatively expensive. Using less pigment, or less titanium dioxide, optionally with additional cheaper pigments or fillers, generally reduces costs but correspondingly reduces paint quality. The stanchion-encapsulated pigment, such as titanium dioxide, when available, used in the present invention has, in effect, superior properties to the normal pigment. The presence of stanchion-encapsulated pigment, such as titanium dioxide permits superior paint qualities and/or similar paint qualities at reduced pigment loading levels. Thus, for example, paint compositions that contain stanchion-encapsulated titanium dioxide or other pigment can move beyond the traditional cost-quality curves obtained by the use of traditional e pigments.

The stanchion-encapsulated pigment comprises a plurality of polymer-coated pigment particles such as titanium dioxide pigment particles wherein the polymeric coating at least partially surrounds each pigment particle and provides stanchions, on at least 10% of the pigment particles, extending from the coating layer so as to protrude outwardly or to connect two or more pigment particles together. A stanchion, which is made out of polymer material, must protrude at least two times the standard coating thickness, or, connect two pigment particles together. Typically the stanchion, on average, has a length of 10 to 500 nm, or even from 10 to 250 nm, or even from 10 to 100 nm. Alternatively, the stanchion length can be related to the diameter of the coated particle and is typically in the range from 0.01 d to about 3.5 d, or even from 0.1 d to about 2 d, or even from 0.5 d to 1 d, where d is the polymer coated particle diameter. In addition, each stanchion can have a width, for example, of less than about 2× the radius of the coated particle from which the stanchion extends. The average number of stanchions per pigment particle is typically in the range from 0.1 to 10, more typically 0.2 to 6. Although the invention is illustrated herein with titanium dioxide, it is applicable to paint compositions using stanchion encapsulation of any of the other pigments previously listed herein.

The stanchion-encapsulated titanium dioxide may contain additional internal structures that separate coated pigment particles. These structures are formed by stanchions and/or coating layers combining to form small spherical structures. These structures are called "particle separators." The discrete particles separators cause separation of the particles and have a size range between 1 nm to 5 um (microns), or even from 1 nm to 2 um or even from 1 nm to 1.5 um or even from 1 nm to 100 um. A typical range for the size of the particle separators is from 5 nanometers to 1500 nanometers. For clarity, the occurrence of particle separators is optional and not necessarily required or present in a stanchion-encapsulated titanium dioxide.

The stanchions in the encapsulated titanium dioxide contribute to an increased spacing between the coated particles in the composition. The particle separators, if present, can also contribute to an increased spacing between the coated particles in the composition. Thus, the stanchions, and particle separators, individually or combined, allow for a reduced density of the coated particles and lead to higher opacity values when the particle composition is used in a paint composition. In addition, the stanchions of the present invention allow for a stable suspension and a higher level of brightness in a coating.

The stanchion-encapsulated titanium dioxide as used in the present invention is illustrated in the figures. In FIG. 1, titanium dioxide pigment particles 1 are depicted surrounded by polymeric coating 3. The stanchions 2 can form bridging between the particles or protrusions. Stanchions 2 can be of the same material as polymeric coating 3 or optionally of a different polymeric material.

Figure 14:
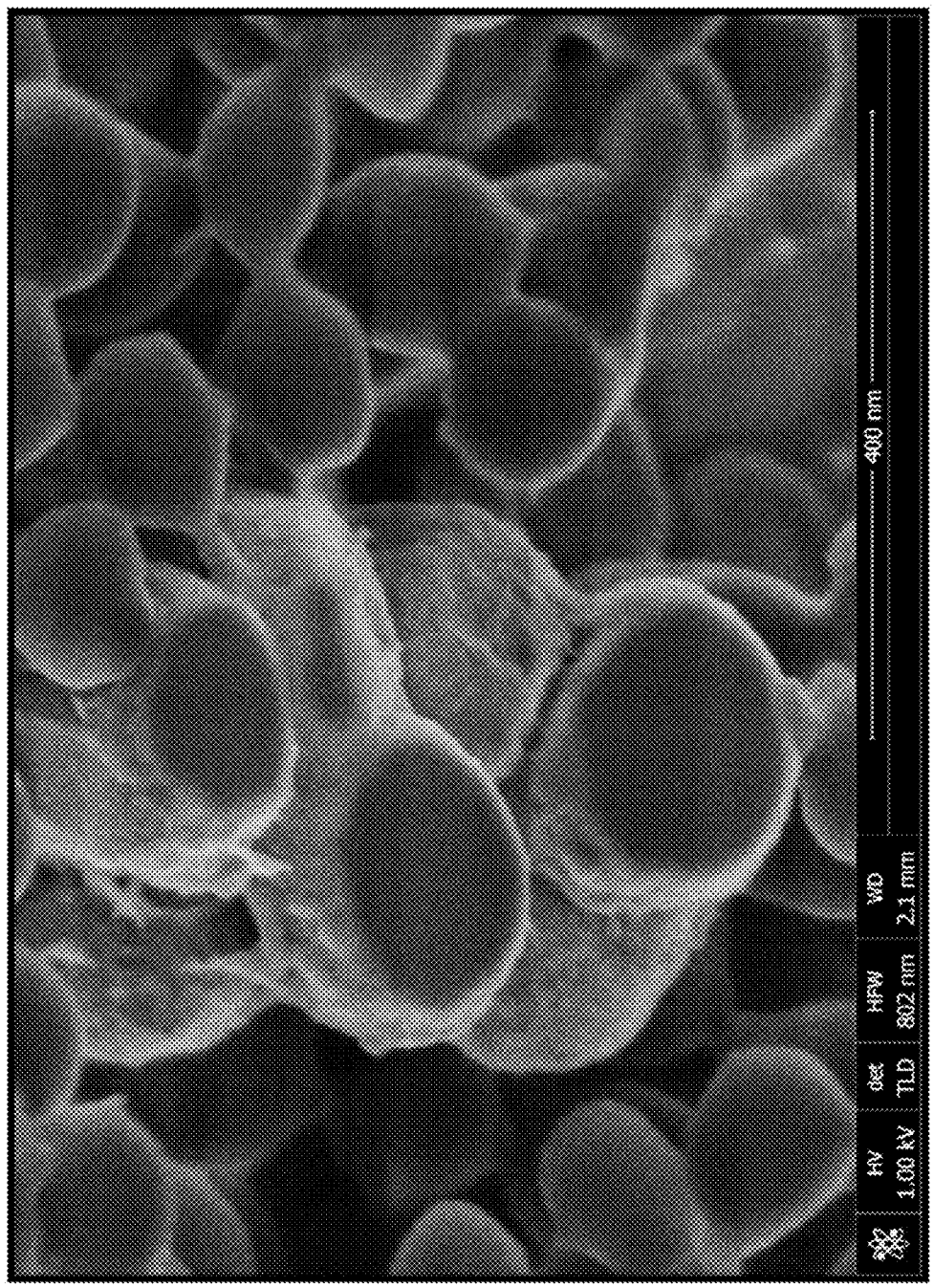
FIG. 14 is a SEM (Scanning Electron Microscope) photograph showing polymer coating details of a particle composition consistent with the present invention.
Figure 15:
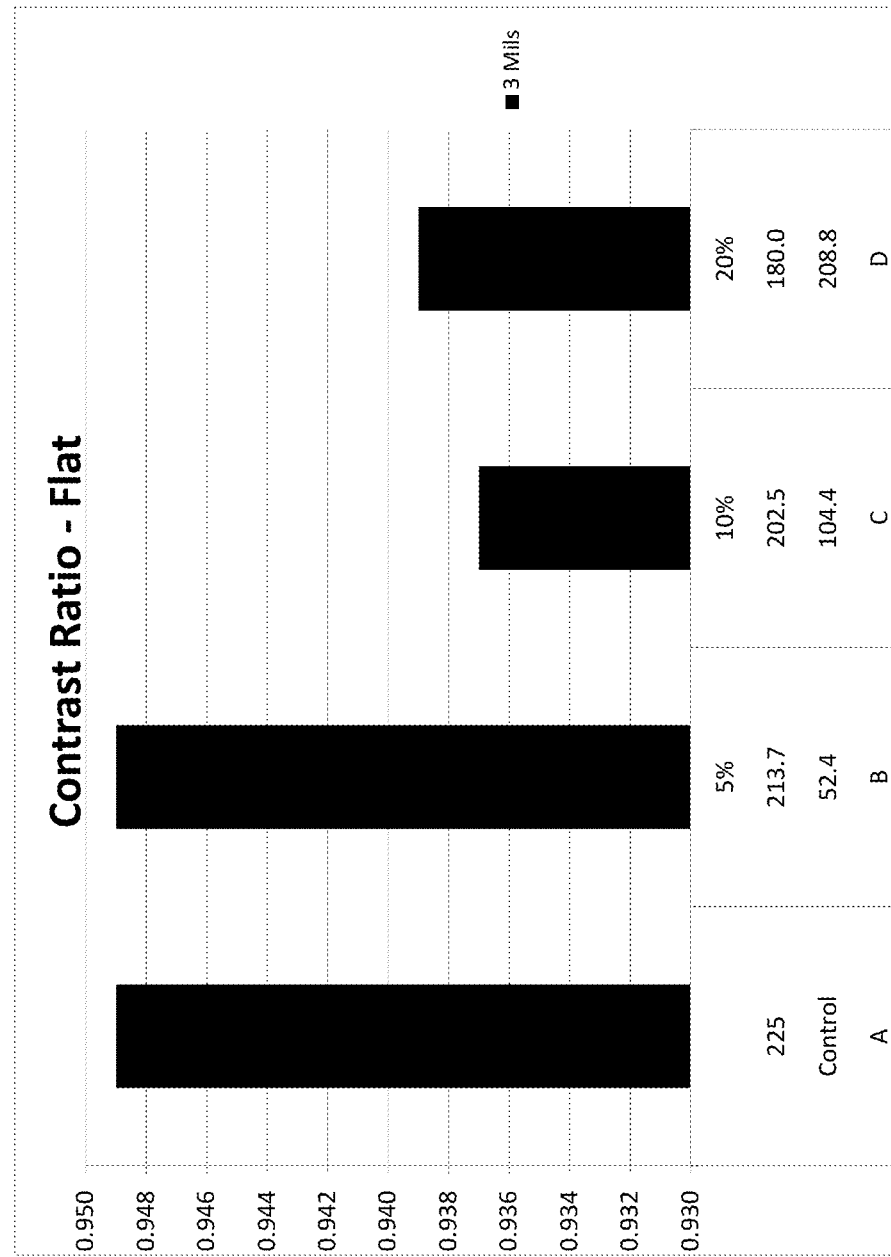
FIGS. 15-20 are test results for paints including those consistent with an embodiment of the present invention.
Figure 16:
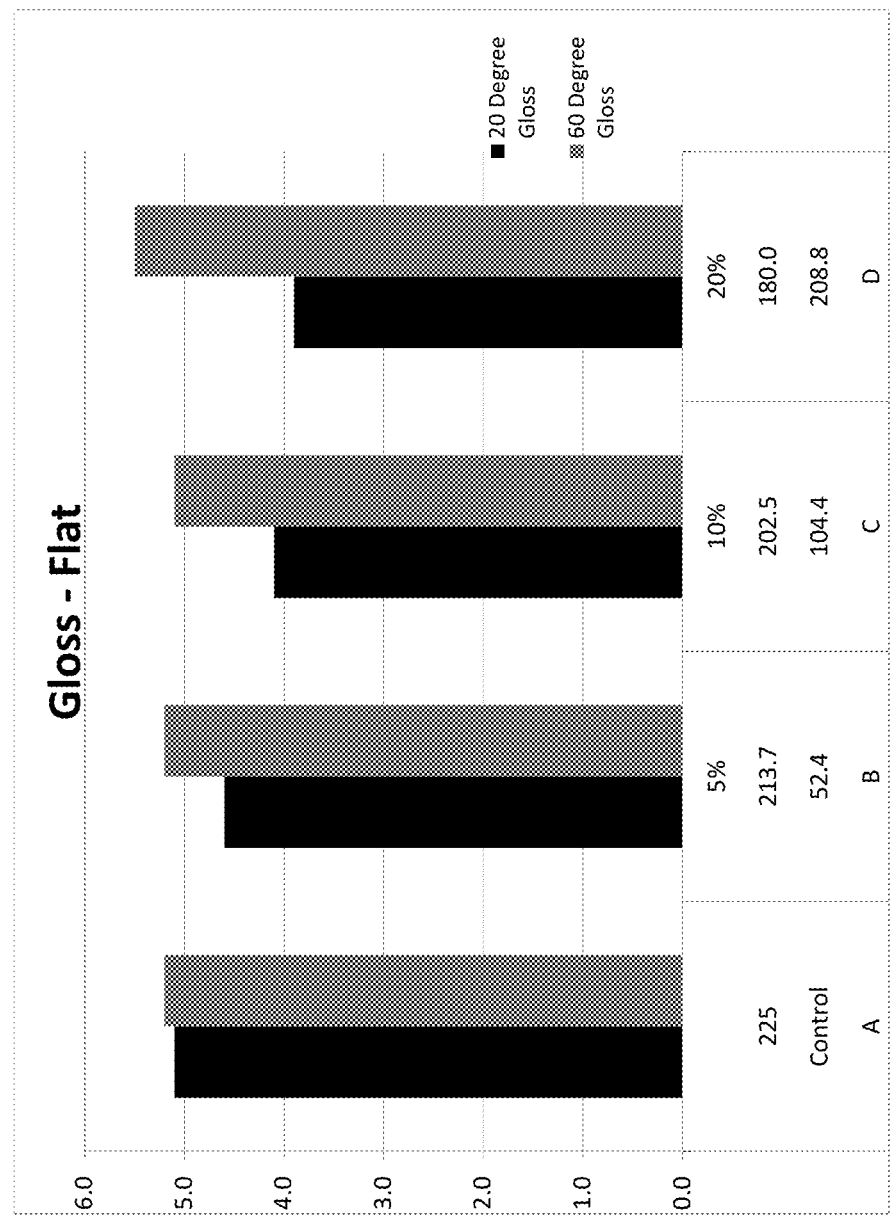
Figure 17:
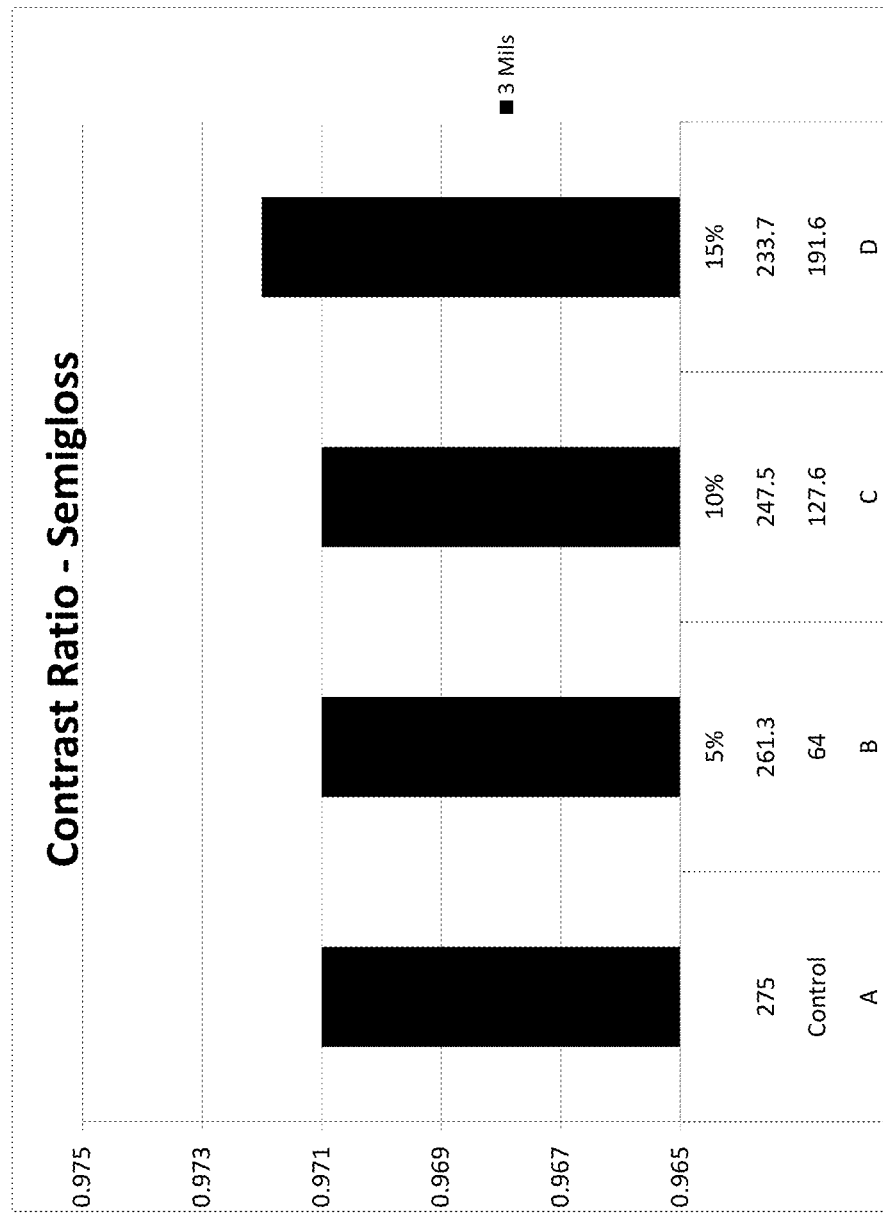
Figure 18:
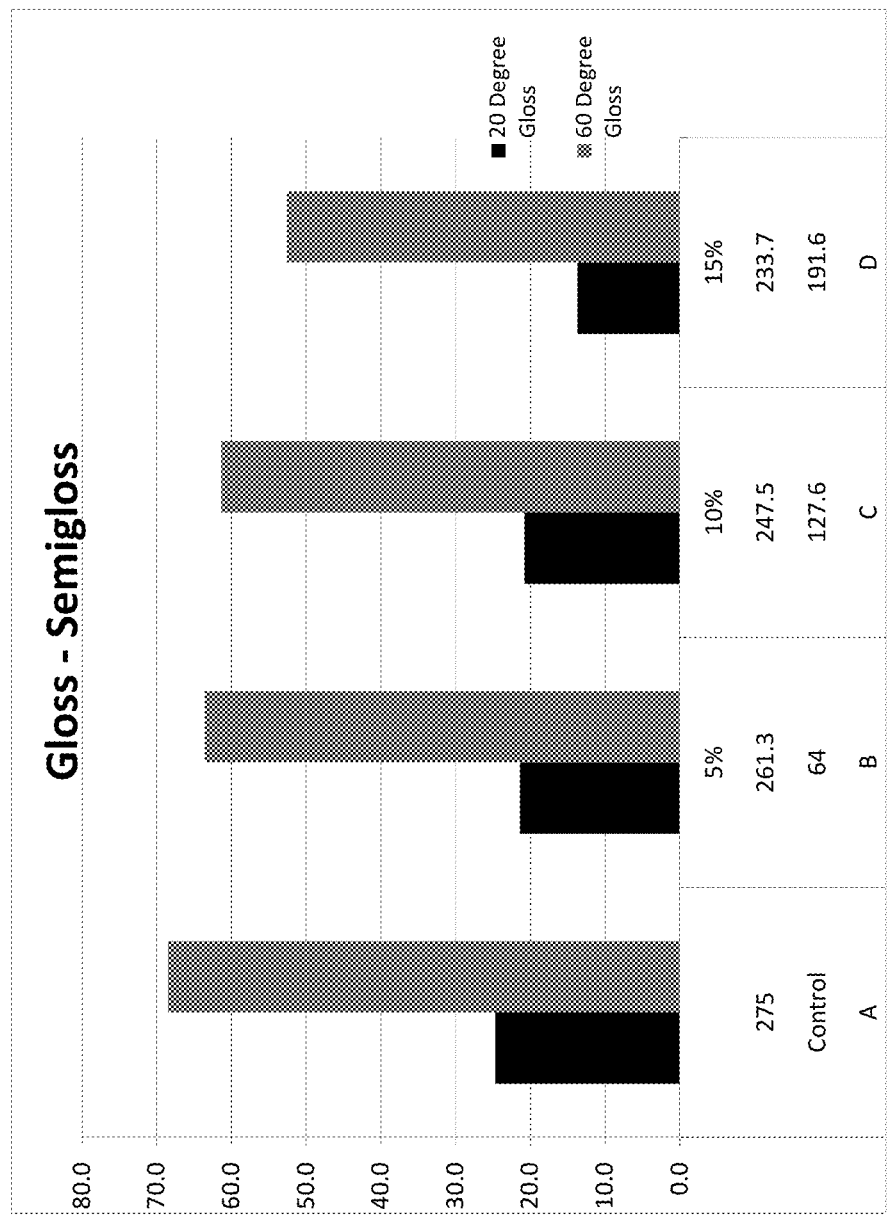
Figure 19:
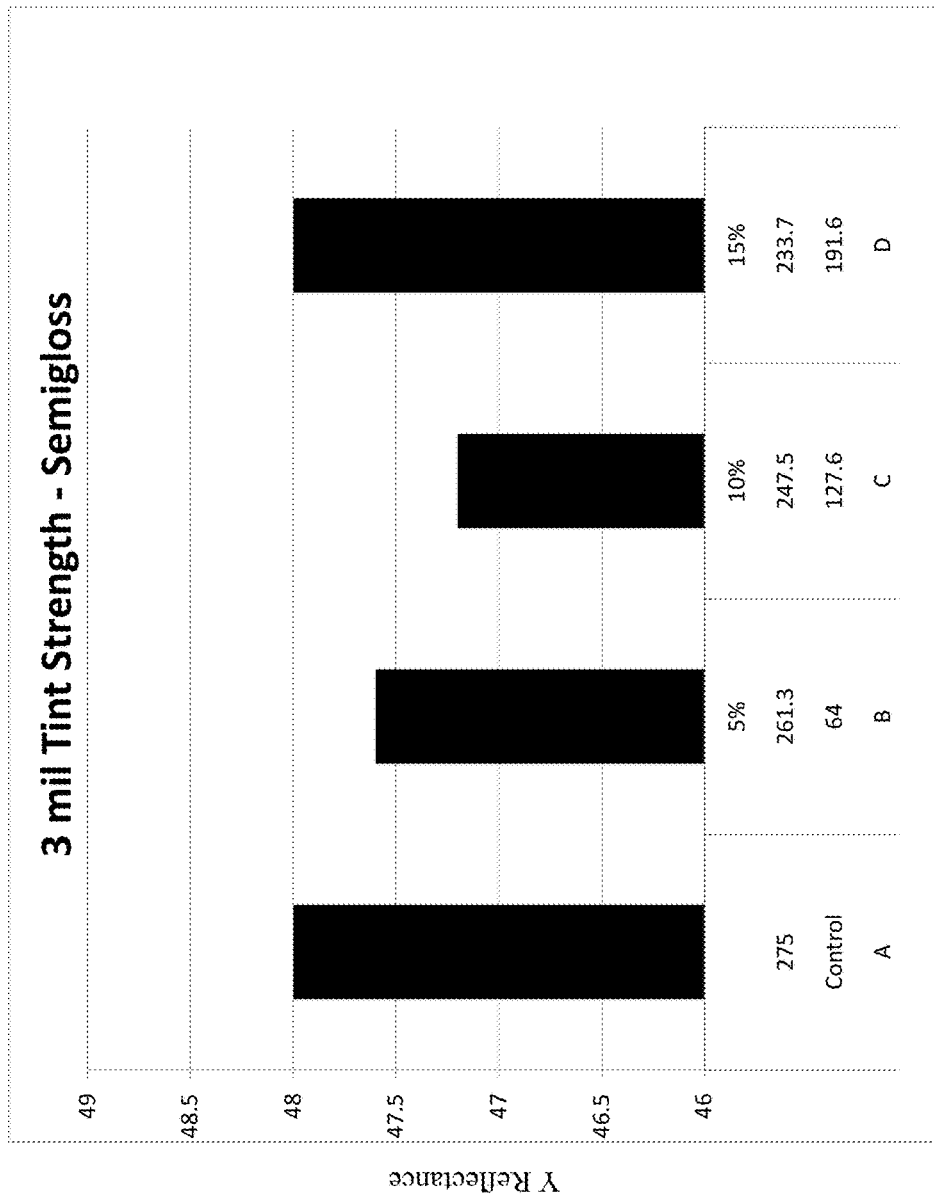
Figure 20:
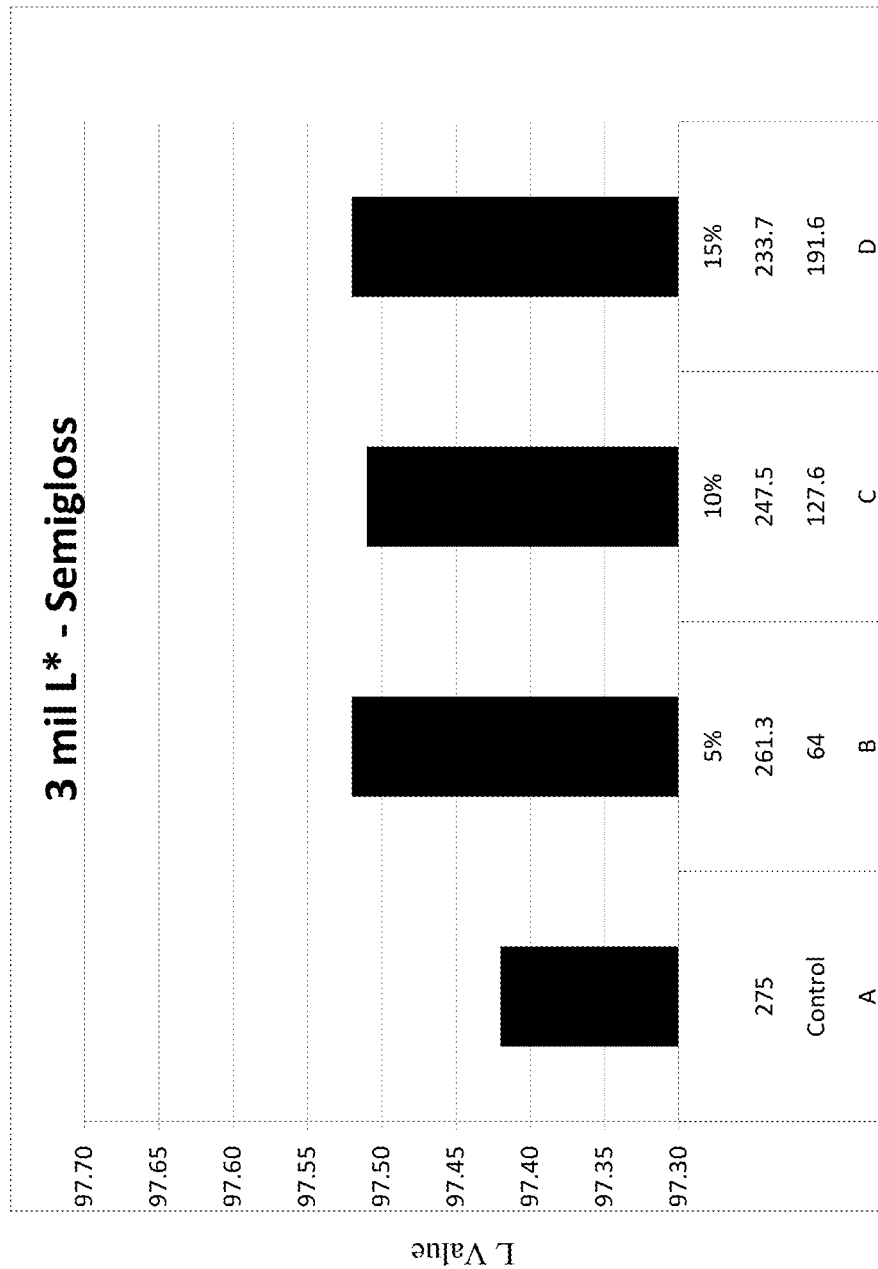

FIGS. 3-13 are TEM photos of a stanchion-encapsulated titanium dioxide. In particular, in FIG. 7, an area of bridging between stanchions of multiple particles 5 can be seen in the bottom of the photo. Further, in FIG. 11, a single particle 1 coated in a polymeric coating 3 is shown which further includes stanchions 2. That is, in this figure, bubble-like projections extend from the surface of a polymeric coating of a particle, in this example, from the methyl methacrylate coating over a titanium oxide particle. In the SEM photo of FIG. 14 polymer coating details of a single particle are shown.

In the preceding paragraphs, the number and dimension of the stanchions are discussed. The method utilized for determining these characteristics is detailed below.

Method for Determining Number of Stanchions and Stanchion Dimensions

1. Prepare photographic images of sample via TEM or SEM using the procedures and instrumentation described below.
2. Select representative images from the photographs.
3. The images will be two dimensional depictions of the sample
4. Utilizing only those pigment particles that are fully shown in the photograph and are not partially cut off, count the number of stanchions on each particle, keeping a running total of the number of stanchions counted and the number of pigment particles until a statistically significant number of pigment particles and their corresponding stanchions are recorded.
5. Stanchions are identified as those structures that connect two or more pigment particles together or protrude by two times or more of the standard coating thickness.
6. Stanchion dimensions are measured as follows:
  (a) Stanchion Length: Draw a line from one pigment particle to the next while dividing the stanchion in half. Measure the distance from the first particle to the second using the scale on the photograph and record the distance. Repeat for all other identified stanchions.
    (i) Note: If a stanchion is only anchored to a single pigment, then draw a line from the pigment to the tip of the stanchion that divides the stanchion in half. Measure the distance from the pigment particle to the tip of the stanchion using the scale on the photograph and record the distance.
  (b) Stanchion Width: Draw a line perpendicular to the stanchion length line at the point halfway along the length of the stanchion. Measure the distance across the stanchion using the scale on the photograph and record the distance. Repeat for all other identified stanchions.
  (c) Using equations 1-1, 1-2 and 1-3 below, calculate the average stanchion length, average stanchion width and average number of stanchions.

Figure 2:
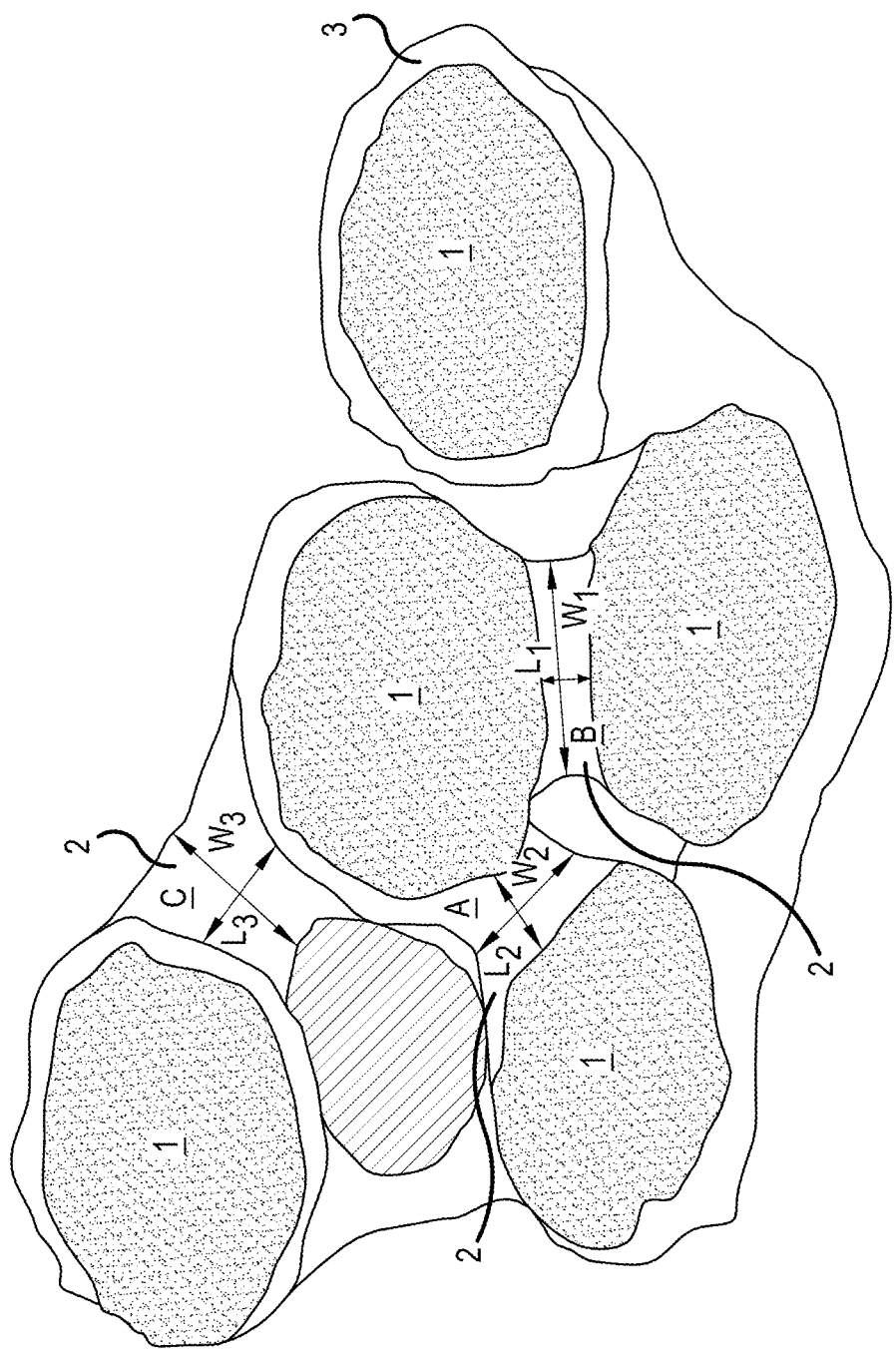
Figure 3:
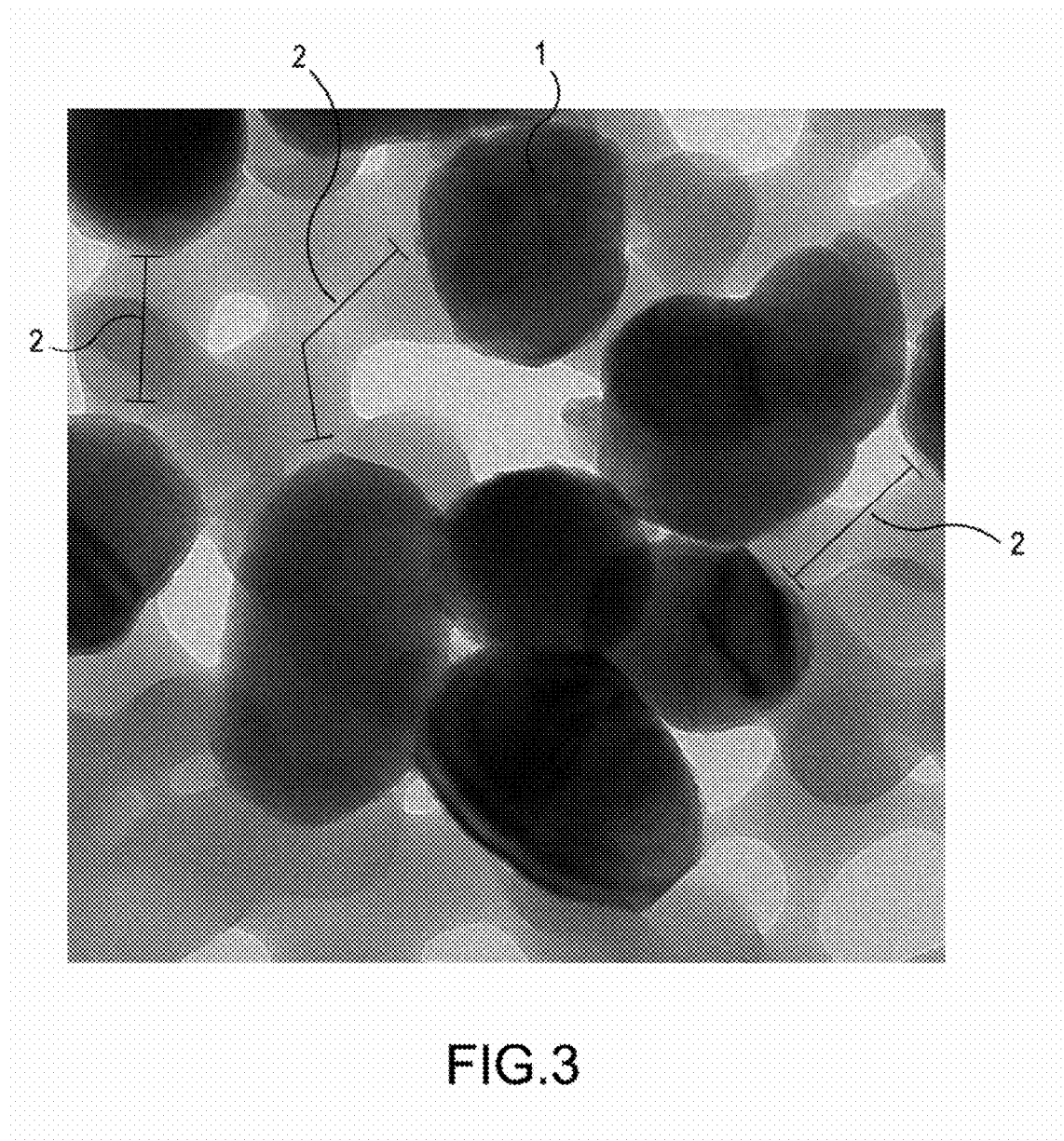
FIGS. 3-13 are TEM (Transmission Electron Microscope) photographs of a particle composition consistent with the present invention.
Figure 4:
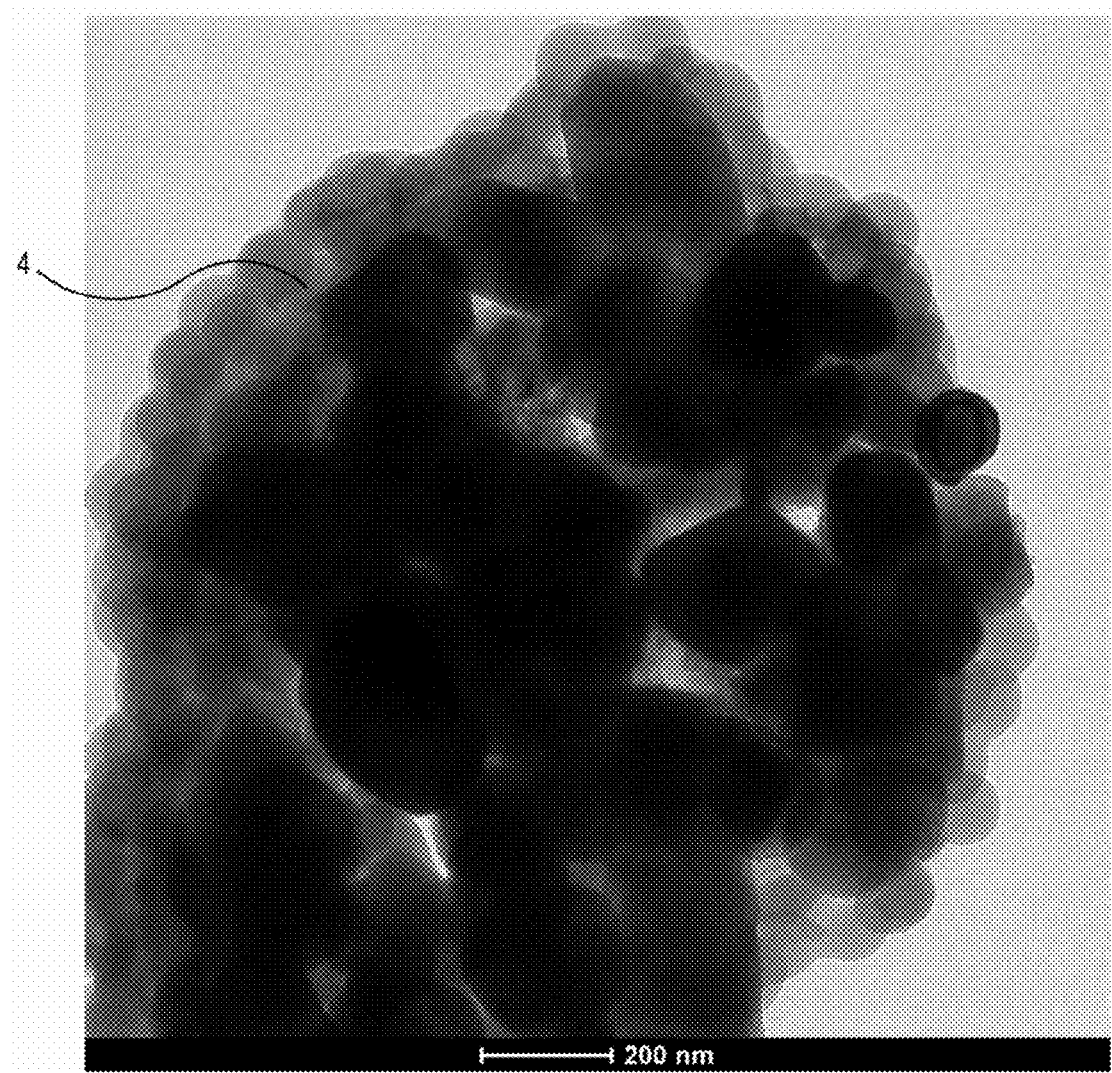
Figure 5:
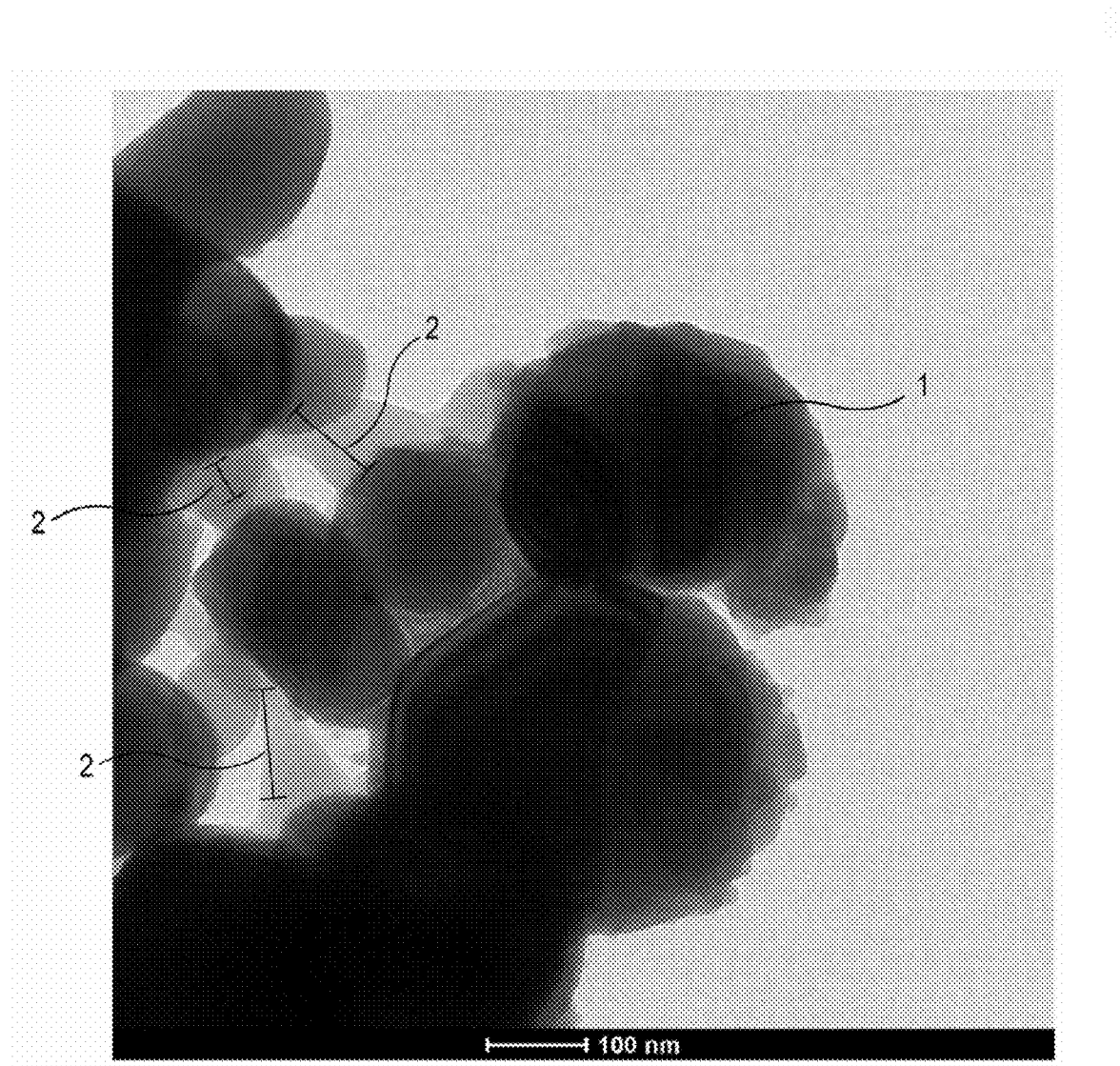
Figure 6:
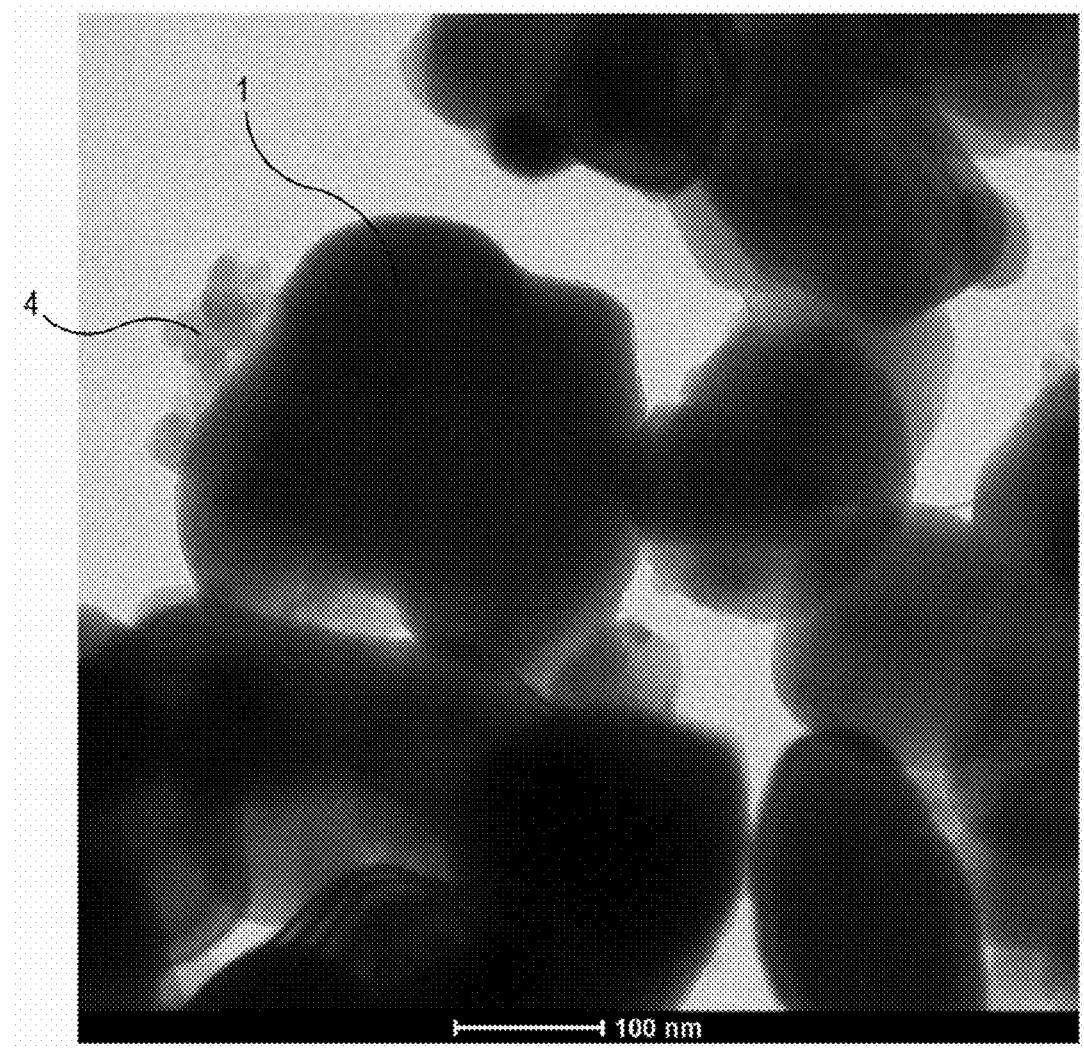
Figure 7:
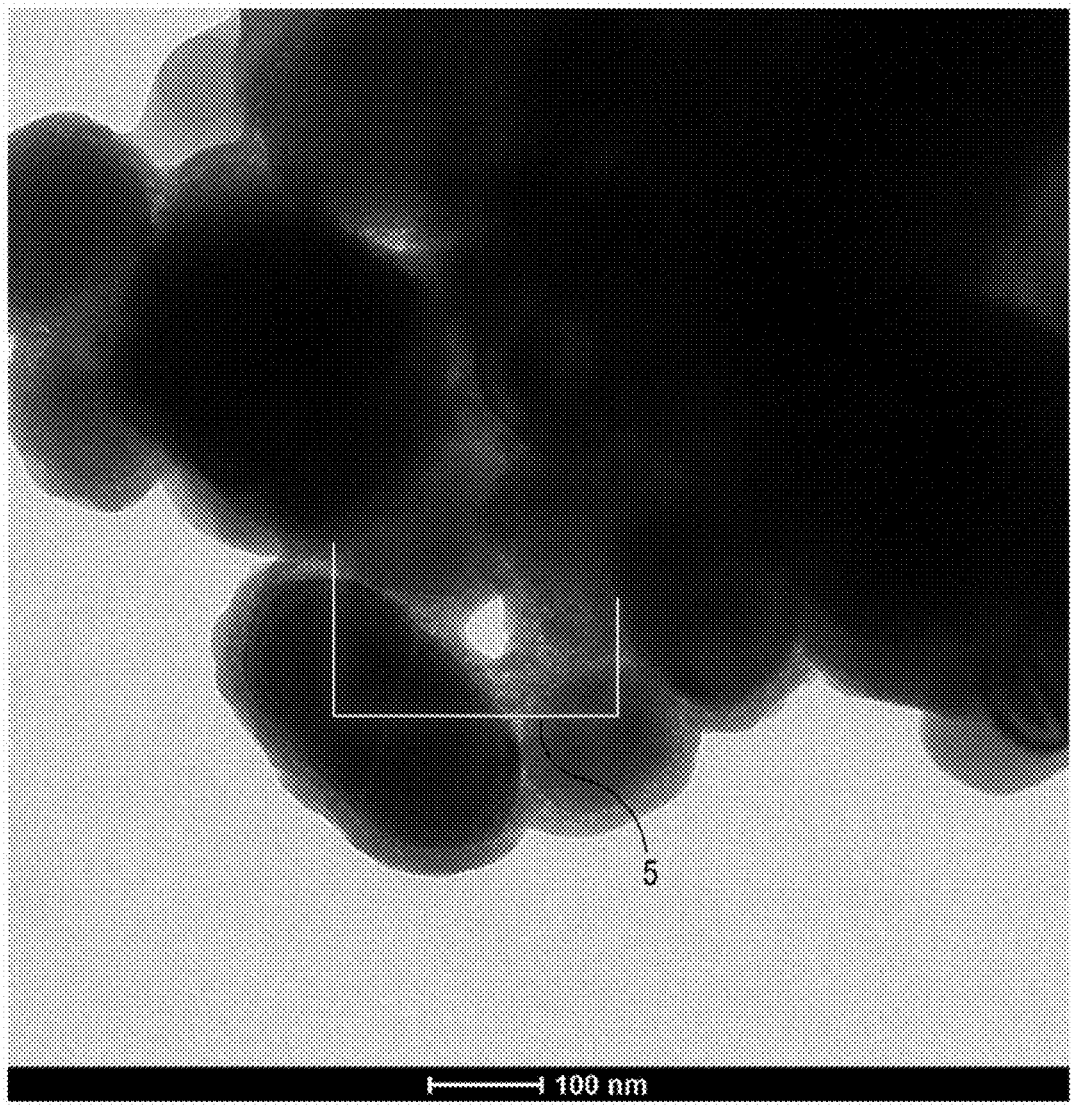
Figure 8:
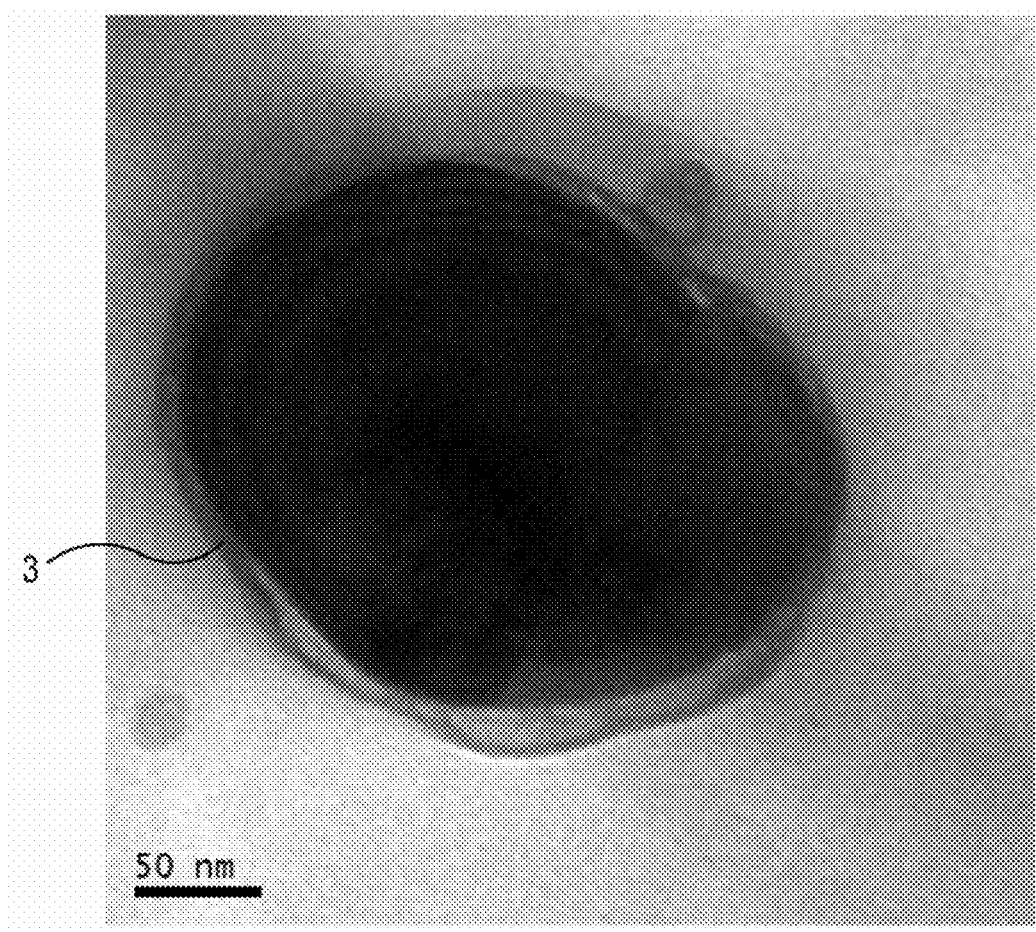
Figure 9:
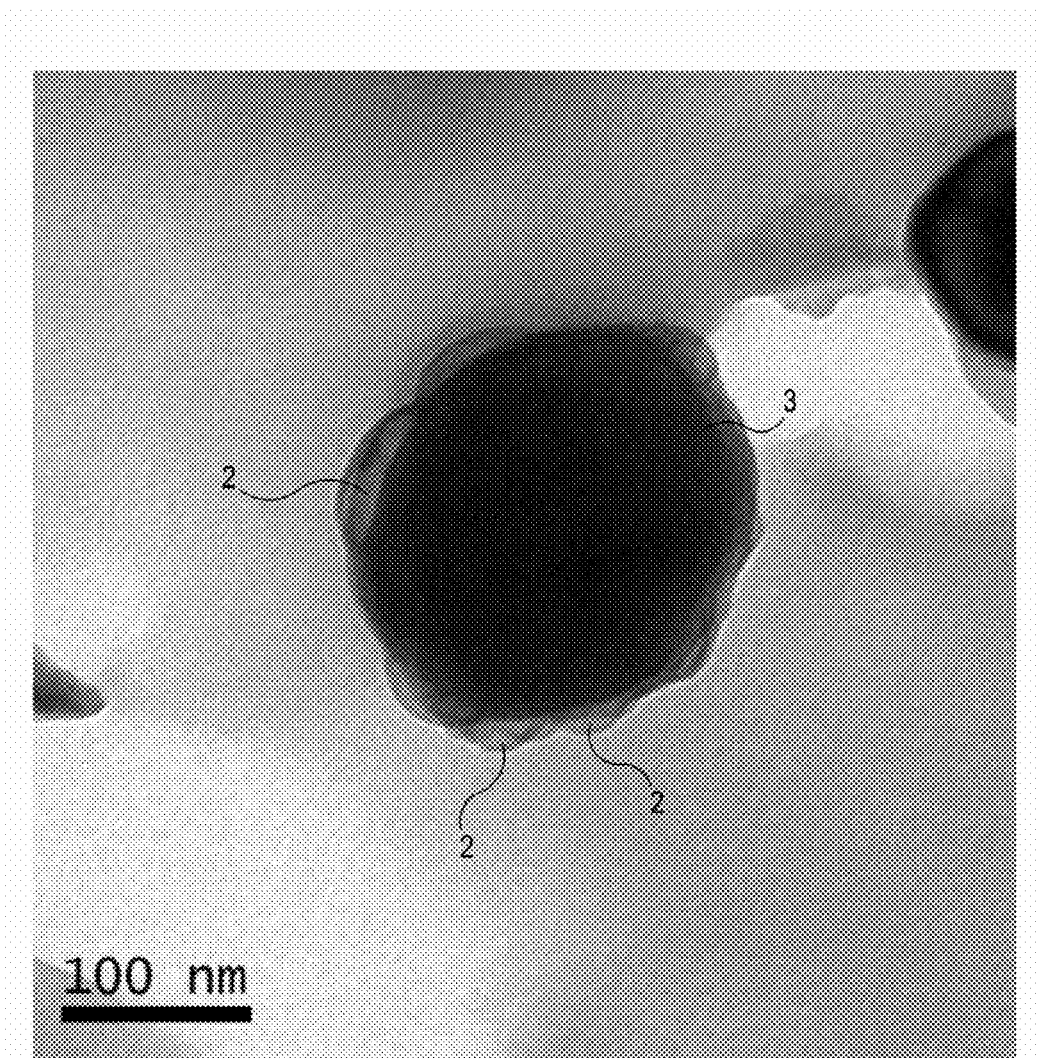
Figure 10:
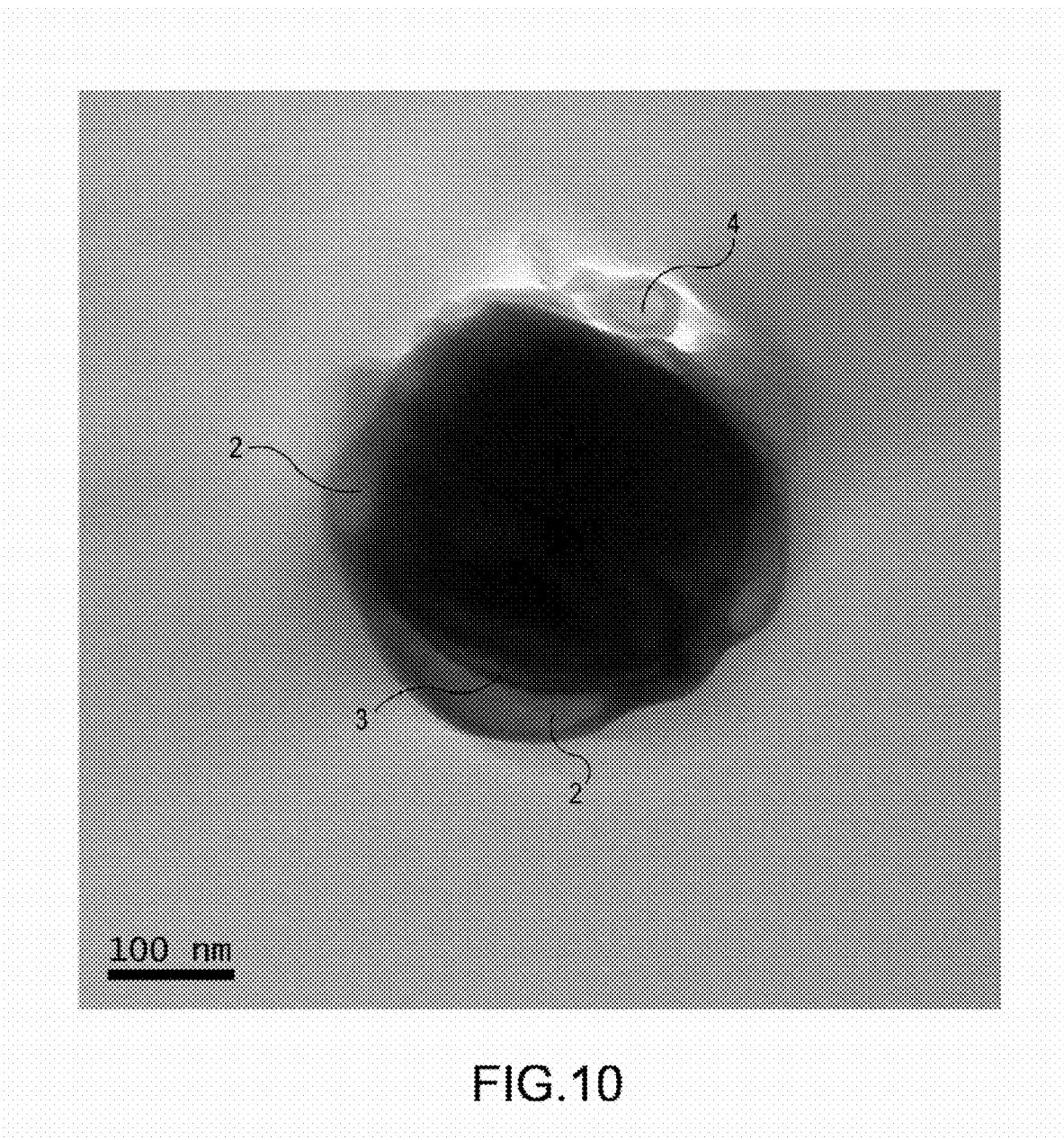
Figure 11:
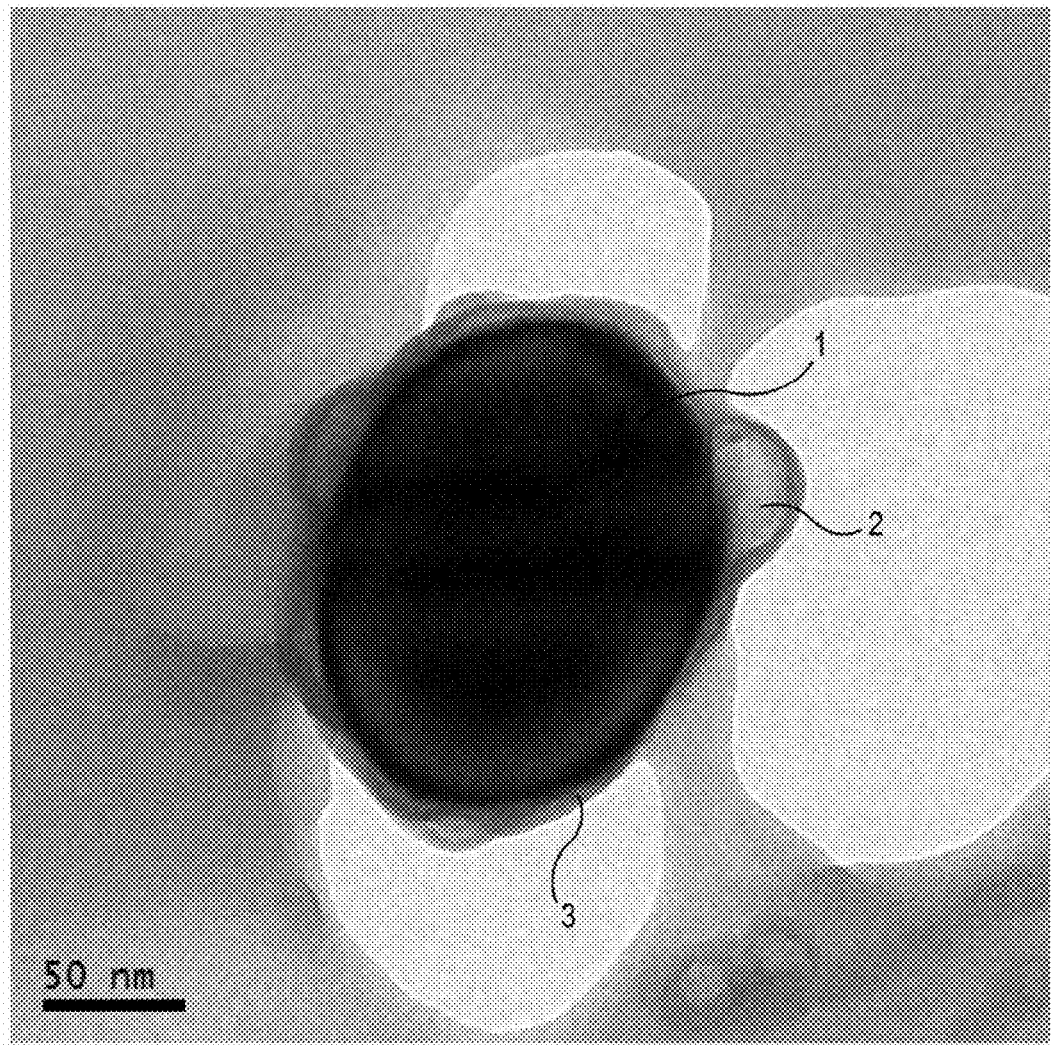
Figure 12:
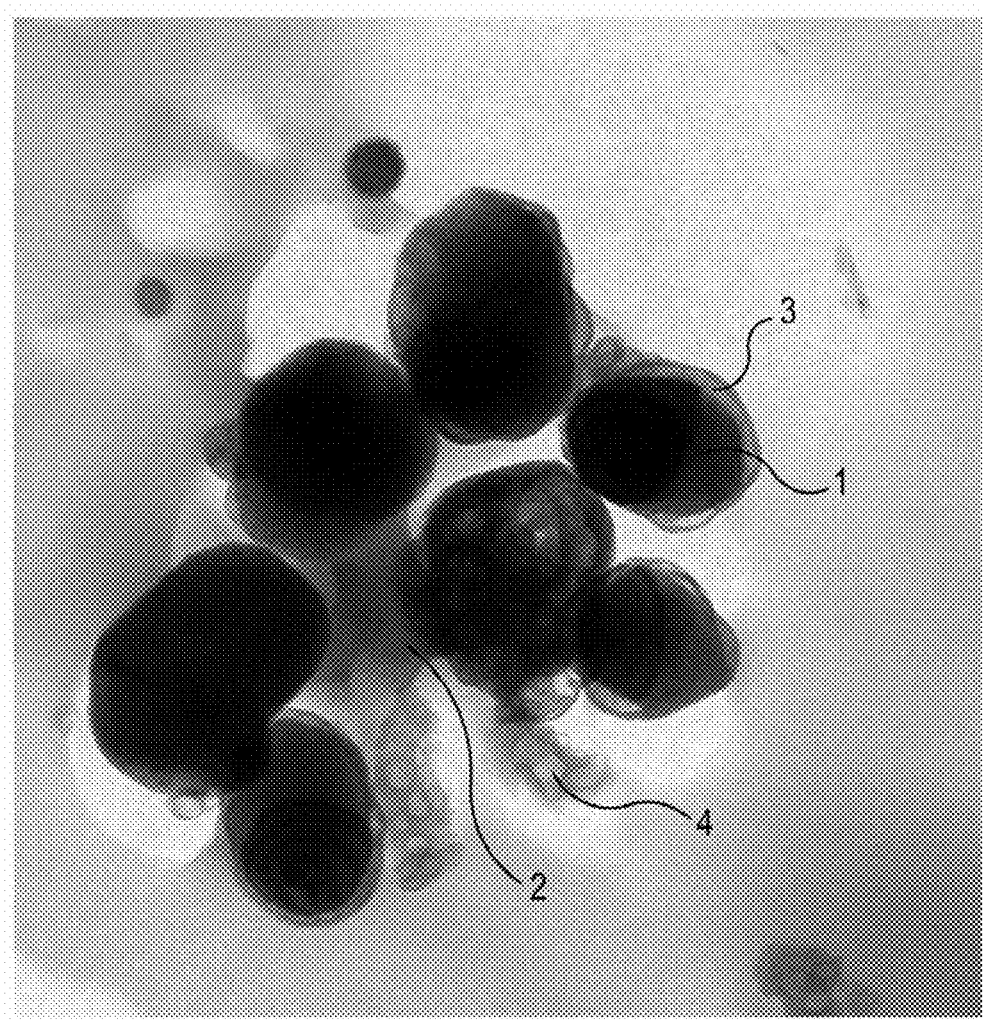
Figure 13:
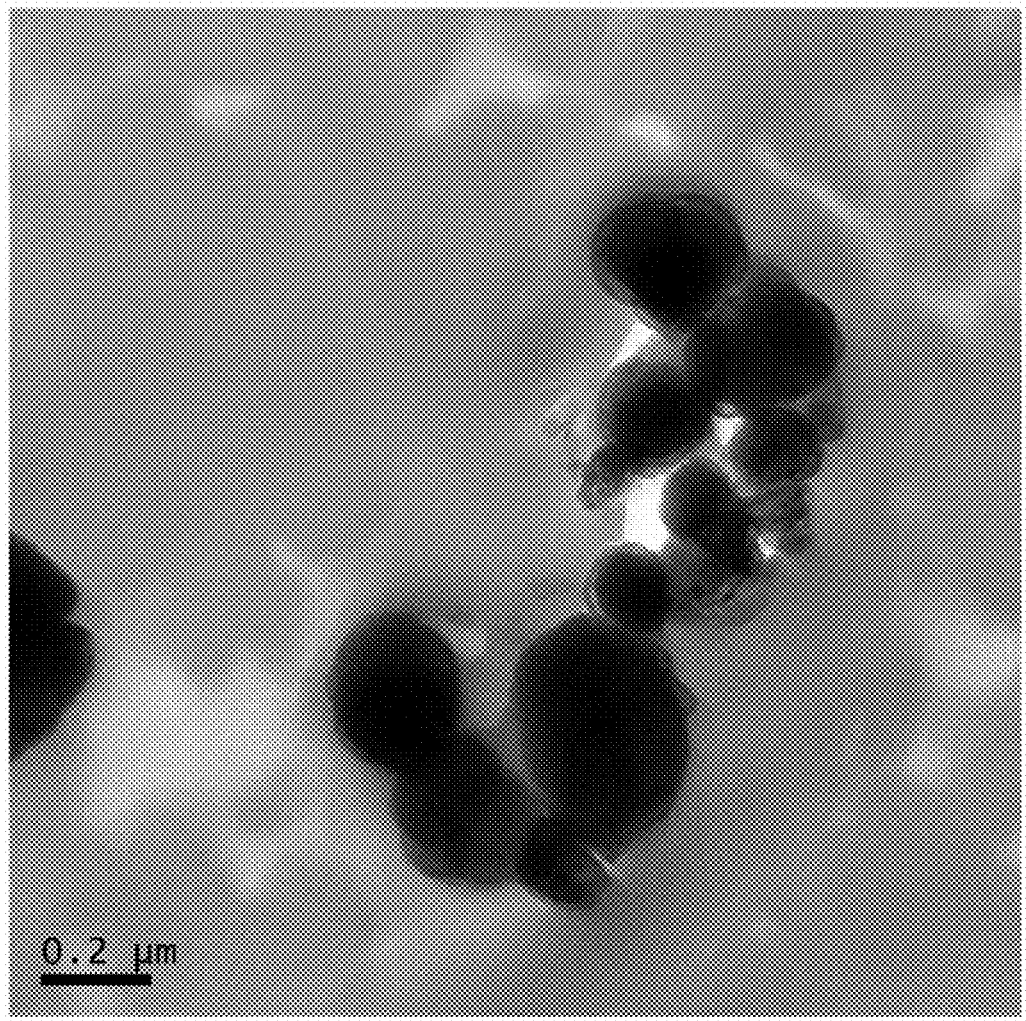

Please refer to FIG. 2 for an indication of examples for the following variables:
1=TiO$_2$ particle
A, B, C=Stanchions
Width (W) and Length (L) are measured microscopically and averaged
Number of stanchions (S) per particle are counted and then averaged $$W_{ave} = \frac{1}{n}\sum_{i=1}^{n} W_i = \frac{W_1 + W_2 + \ldots + W_i}{n} \quad (1\text{-}1)$$

$$L_{ave} = \frac{1}{n}\sum_{i=1}^{n} L_i = \frac{L_1 + L_2 + \ldots + L_i}{n} \quad (1\text{-}2)$$

$$S_{ave} = \frac{1}{n}\sum_{i=1}^{n} S_i = \frac{S_1 + S_2 + \ldots + S_i}{n} \quad (1\text{-}3)$$

Methods for preparing photographic images of sample via TEM and SEM are detailed below.

TEM Test Method

The aqueous TiO$_2$ suspensions were diluted with distilled water and sonicated in a sonicator (Cole-Parmer Model 8890) for 5 minutes. A drop of the solution was put on a 300 mesh Formvar grid and allowed to sit for 5 minutes. The remaining solution was gently blotted away and the grid was allowed to air dry. The sample grids were subsequently examined in bright field mode on an FEI Tecnai Spirit BioTWIN transmission electron microscope operating at 120 kV. Images were collected on an Eagle 2 k×2 k camera and subsequently converted to tiff format.

An alternative method was to embed the encapsulated TiO$_2$ powders in a resin, for example an acrylic or an epoxy resin, in an embedding mold, and then the sample was cut into ultra-thin sections (40-60 nm thick) using a diamond knife by ultra-microtome (Richelt Ultracut E) after the resin had been cured. The captured sections were place on copper grids, and images were subsequently collected on a Hitachi H-7500 transmission electron microscope.

SEM Test Method

SEM images were collected with a field emission scanning electron microscope (FESEM), for example, Helio Nanolab™ 650 manufactured by FEI Company (5350 NE Dawson Creek Drive, Hillsboro, Oreg. 97124). The sample of aqueous TiO$_2$ suspensions were frozen and prepared in a cryo specimen preparation chamber, and the sample was then milled with focused ion beam (FIB) to reveal the cross section of the sample, polished to remove the rough milling artifacts. Images were then collected after a small amount of water was liberated from the across section, revealing the morphology and structure of the particles.

Where the pigment particles are titanium dioxide, the titanium dioxide pigment particles used in the stanchion-encapsulation are not particularly limited. A variety of forms including rutile, anatase, brookite, and amorphous are known and are suitable for use in the present invention. Rutile and anatase can be photocatalytic. Titanium dioxide particles can be surface treated with materials such as aluminum oxide, silicon dioxide, tetra ethoxysilane, or zinc oxide. Such surface treatments can be applied to increase dispersibility, UV absorption, or to alter photocatalytic properties.

The titanium dioxide or other pigment particles have an effective pigment size which can range from 1 nm (nanometer) to 2000 nm, or even to 5000 nm. Typically the uncoated pigment particles such as titanium dioxide particles range from 1 nm to 2000 nm, more often from 10 nm to 1000 nm, and sometimes from 20 nm to 500 nm.

In general the pigment particles such as titanium dioxide particles comprise 30 to 70%, more typically 40 to 60%, and in some cases around 50% (e.g. +/−5), of the total weight of the stanchion-encapsulated titanium dioxide.

The polymeric material used to at least partially surround the pigment particle is not particularly limited and can be made of one or more polymers and optionally with additional ingredients therein. In principle any polymer that can be formed on the pigment particle, optionally with an intervening particle surface coating(s) or treatment(s), can be used. Typically the polymeric material comprises at least one polymer selected from polyacrylate, polymethacrylate, polyalkyl(meth)acrylate, polystyrene, melamine formaldehyde, urea formaldehyde, polyvinyl alcohol, polyvinyl acetate, and combinations thereof. The alkyl group is generally a C1 to C24, but more typically is a C1-C8, or C1-C4 group including straight and branched forms. The polymeric material not only partially or completely surrounds the particle (e.g., as a particle coating or wall material) but also forms the stanchions. Normally the same polymeric material is used to form the coating and the stanchions, but such is not required. For example, the coating or wall polymeric material could be formed on the particles and then one or more monomers could be changed or added to form the stanchions from a different polymeric material.

The stanchion-encapsulated pigment such as stanchion-encapsulated titanium dioxide can generally contain as little as about 20-25% titanium dioxide (or other pigment) up to about 80-85% titanium dioxide, by weight, the remainder being the encapsulating material. Typically the stanchion-encapsulated pigment such as stanchion-encapsulated titanium dioxide contains from 30% to 70%, often 40% to 60%, and in some embodiments around 50% (e.g. 50%+/−5) by weight of the polymeric material. Lower amounts of encapsulating polymer material, such as 20% (i.e., 80% $TiO_2$), yield useful encapsulated pigments but do not offer the cost benefit of the higher polymer content pigment materials. For example, using 10 pounds of a stanchion-encapsulated titanium dioxide that is 50% polymer and 50% titanium dioxide may provide essentially the same paint quality as 10 pounds of conventional titanium dioxide but only half (5 pounds) the titanium dioxide.

The stanchion-encapsulated titanium dioxide results in encapsulated pigment particles having a coated particle size from 1 nm to 7500 nm, more typically from 1 to 5000 nm, more commonly from 3 nm to about 3500 nm, and sometimes from 10 nm to 2500 nm, or even from 10 nm to 2000 nm. Larger particles of a size from 2 microns to 100 microns or from 2 microns to 1000 microns are possible, if the polymeric coated particulates are agglomerated.

A method for determining the median particle size of the coated particles of the present invention is detailed below.

Determination of Median Particle Size

Median particle size is measured using a Zetasizer, made by Malvern Instruments, Ltd, Enigma Business park, Grovewood Road, Malvern, Worcestershire, WR14 1XZ, United Kingdom. Samples for particle size evaluation are prepared by diluting 1 drop of the encapsulated $TiO_2$ slurry in 1 milliliter of de-ionized water in a cuvette, which is then placed in the sample cell of the instrument. The instrument will display the results, including volume weighted median size.

With reference to FIG. 2, the broadness index can be calculated by determining the particle size at which 95% of the cumulative particle volume is exceeded (95% size), the particle size at which 5% of the cumulative particle volume is exceeded (5% size), and the median volume-weighted particle size (50% size-50% of the particle volume both above and below this size). Broadness Index=((95% size)−(5% size)/50% size).

As noted, the features of the stanchion-encapsulated titanium dioxide contribute to a reduced density of particles in the composition. The encapsulated pigment particle composition has a lower density value as compared to the density value of the unencapsulated pigment. In particular, the stanchion-encapsulated titanium dioxide can have a density of less than 2.72 $g/cm^3$, which is around 34% lower than the nominal density value of un-encapsulated pigment $TiO_2$ material (e.g. 4.23 $g/cm^3$). The density value of the encapsulated particle composition of the invention can be at least 10%, normally at least 20%, typically at least 30%, and sometimes at least 40% lower than the density value of the un-encapsulated pigment material.

The encapsulation process transforms one or more monomeric materials into a polymeric coating on a particle such as titanium dioxide, and also can give rise to stanchioning and one or more macro molecular particle separators. Applicants have surprisingly found that by carefully managing mixing speed range of the coating process and concentration gradient during monomer addition, the size and degree of stanchioning and formation of particle separators 4 can be affected. Optionally, particle separators can be separately added. More efficiently, the separators are optimized to form during the encapsulation process, along with the stanchioning. Optionally, the particle separators and stanchions are the same polymeric materials as the polymeric coating on the particles. However, optionally, each can be formed from a different monomeric material.

One way to form stanchion-encapsulated titanium dioxide uses the following steps:

1. Preparing an aqueous solution comprising dispersing agent(s) in a beaker (or vessel);
2. Dispersing solid ($TiO_2$) particles into the above prepared aqueous solution to form a suspension with a mixer;
3. Adjusting pH of the suspension to 9-10, if needed, by the addition of 10% sodium hydroxide solution;
4. Homogenizing the suspension to achieve a good dispersion of the particles in water;
5. Transferring the suspension into a reactor containing additional water;
6. Purging the reactor with nitrogen gas;
7. Adding wall materials into the reactor, which can be monomers and/or oligomers;
8. Adding initiator(s);
9. Raising the temperature in the reactor to initialize the polymerization of the monomers and/or oligomers;
10. Maintaining the temperature and controlling process variables during the polymerization to control wall deposition, and to minimize the agglomeration of the encapsulated particles.

The above process steps are not mandatory and can be varied in many ways as understood by a worker skilled in the art. The dispersing agents can be an organic or an inorganic chemical, or a combination thereof. Typical dispersing agents that can be used include sodium dodecyl sulfate, sodium silicate, sodium polyphosphate, sodium alkyl sulfonate, sodium alkylbenzene sulfonate, sodium alkylnaphthalene sulfonate, polyacrylic acid and its derivatives, polymethacrylic acid and its derivatives, polyethylene oxide and its derivatives, styrene maleic anhydride copolymers.

The particle in water suspension can be prepared by any means, such as a mechanical shear, a homogenizer, a rotorstator mixer, an in-line mixer, a microfluidic mixer, or an ultrasonic device.

Initiators and/or catalysts may be used to initiate the polymerization reaction. Selection of initiators and/or catalysts depends on the wall materials used. For acrylic monomers, sodium persulfate, ammonium persulfate, or redox initiators may be used.

If desired, the charge of the encapsulated particle can be modified. The charge of the encapsulated particle can be altered in zeta potential. The observed zeta potential tends to be positive at low pH and lower or negative at high pH. By selection of emulsifiers, initiators, monomers, or additives in the encapsulation process, the encapsulated particle can be modified to be anionic, nonionic, or cationic.

For example, Schwantes, U.S. Pat. No. 8,067,089 teaches forming cationic charged or neutral micro capsules through use of a cationic or nonionic emulsifiers. Cationic emulsifiers can include amines with primary, secondary or tertiary functionality. Nonionic emulsifiers can include polymers with hydroxyl, ether, ester, ketone and amide functionality.

Cationic emulsifiers can be selected from palmitamidopropyltrimonium chloride, distearyl dimonium chloride, cetyltrimethylammonium chloride, quaternary ammonium compounds, fatty amines, aliphatic ammonium halides, alkyldimethylbenzylammonium halides, alkyldimethylethylammonium halides, polyethyleneimine, poly(2-dimethylamino)ethyl methacrylate)methyl chloride quaternary salt, poly(1-vinylpyrrolidone-co-2-dimethylaminoethyl methacrylate), poly(acrylamide-co-diallyldimethylammonium chloride), poly(allylamine), poly[bis(2-chloroethyl)ether-alt-1,3-bis[3-(dimethylamino)propyl]urea] quaternized, and poly(dimethylamine-co-epichlorohydrin-co-ethylenediamine), and condensation products of aliphatic amines with alkylene oxide.

Cationic emulsifier can include polyalkylenimine compounds wherein the alkylene moieties are from 2 and 8 carbons, and more useful are molecular weights of from 1000 to about 250000. Cationic emulsifiers include palmitamidopropyltrimonium chloride (trademark Varisoft Patch, Evonik Degussa GmbH, Essen, Germany) distearyl dimonium chloride, cetyltrimethylammonium chloride, and polyethyleneimine.

Useful amines can include, by way of illustration and not limitation, amine modified vinyl monomers including amine modified acrylates or methacrylates such as mono or diacrylate amines, mono or dimethacrylate amines, amine modified polyetheracrylates and amine modified polyethermethacrylates, aminoalkyl acrylates or aminoalkyl methacrylate.

The amines can include primary, secondary or tertiary amines and can include tertiary butyl aminethylmethacrylate, diethylaminoethyl methacrylate, or dimethylaminoethyl methacrylate.

Nonionic emulsifier can be selected from polyalkylene glycol ether, condensation products of alkyl phenols, aliphatic alcohols, or fatty acids with alkylene oxide, ethoxylated alkyl phenols, ethoxylated arylphenols, ethoxylated polyaryl phenols, carboxylic esters solubilized with a polyol, polyvinyl alcohol, polyvinyl acetate, or copolymers of polyvinyl alcohol polyvinyl acetate, polyacrylamide, poly(N-isopropylacrylamide), poly(2-hydroxypropyl methacrylate), poly(2-ethyl-2-oxazoline), poly(2-isopropenyl-2-oxazoline-co-methyl methacrylate), poly(methyl vinyl ether), and polyvinyl alcohol-co-ethylene).

Suitable emulsifiers can also include amphoteric emulsifiers and zwitterionic emulsifiers.

In some embodiments, it is desirable that the emulsifier is physically or chemically bound or entangled to the external surface of the encapsulated pigment particles. Such physical bindings include, for example, hydrogen bonding, ionic interactions, entanglement, hydrophobic interactions, and electron transfer interactions. Such chemical bindings include, for example, covalent bindings such as covalent grafting and crosslinking. The emulsifier can be added during the process of encapsulation or as a post-treatment after the encapsulate is formed.

The emulsifier is typically present at a level by weight of from about 0.1% to about 40%, from about 0.5% to about 10%, or from about 0.5% to about 5%, by weight of the encapsulated particle. In one embodiment, the polymeric wall material is a polyacrylate or polyalkylacrylate, to which the emulsifier is added during the process of encapsulation, or as a post-treatment.

Anionic emulsifiers can include, by way of illustrating and not limitation, water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate, sodium dialkylsulfosuccinates, dioctyl sulfosuccinate, sodium dilaurylsulfosuccinate, poly(styrene sulfonate) sodium salt, isobutylene-maleic anhydride copolymer, gum arabic, sodium alginate, carboxymethylcellulose, cellulose sulfate and pectin, poly(styrene sulfonate), isobutylene-maleic anhydride copolymer, gum arabic, carrageenan, sodium alginate, pectic acid, tragacanth gum, almond gum and agar; semi-synthetic polymers such as carboxymethyl cellulose, sulfated cellulose, sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol, phosphated or sulfated tristyrylphenol ethoxylates.

In an alternate embodiment, it is useful to use anionic emulsifiers that have acrylate functionality since these can be covalently linked to the shell or wall portion of the polymeric coating encapsulating the pigment particles, particularly when the polymeric material encapsulating the solid particles is polyacrylate or an alkyl acrylate acrylic acid copolymer. During the process of encapsulating the pigment particles, emulsifiers can be included. Anionic emulsifiers can include, but are not limited to poly(meth)acrylic acid; copolymers of (meth)acrylic acids and its (meth)acrylates with C1-C26 alkyl, C1-C22 alkyl, such as butyl, copolymers of (meth)acrylic acids and (meth)acrylamide; carboxyvinylpolymer, acrylate copolymers such as acrylate/C10-30 alkyl acrylate crosspolymer, acrylic acid/vinyl ester copolymer/acrylates/vinyl Isodecanoate crosspolymer, acrylates/trademarks Palmeth-25 acrylate copolymer, Acrylate/Steareth-20 Itaconate copolymer, and Acrylate/Celeth-20 Itaconate copolymer, polystyrene sulphonate, copolymers of methacrylic acid and acrylamidomethylpropane sulfonic acid, and copolymers of acrylic acid and acrylamidomethylpropane sulfonic acid, carboxymethycellulose; carboxy guar, copolymers of ethylene and maleic acid, and acrylate silicone polymer. In some embodiments, if desired, neutralizing agents may be included to neutralize the anionic emulsifiers herein. Non-limiting examples of such neutralizing agents include sodium hydroxide, potassium hydroxide, ammonium hydroxide, monoethanolamine, diethanolamine, triethanolamine, diisopropanolamine, aminomethylpropanol, tromethamine, tetrahydroxypropyl ethylenediamine, and mixtures thereof. Commercially available anionic emulsifiers include, for example, Carbomer supplied from Noveon under the trademark Carbopol 981 and Carbopol 980, acrylates/C10-30 alkyl acrylate copolymers sold under name Pemulen TR-1, Pemulen TR-2, Carbopol 1342, Carbopol 1382, and Carbopol ETD 2020, such as available from Noveon, sodium carboxymethylcellulose (Hercules CMC series), and acrylate copolymer (trademark Capigel from Seppic).

Optionally, the pigment may be coated, such as with a cationic polymer. In a sense, the encapsulated pigment particle can be considered a microcapsule. With anionic polymeric wall material encapsulating the solid particle, the cationic polymer allows partial or complete neutralization of the negative electrical charge borne by the encapsulated solid particles, or microcapsule wall material, or even the conversion of the negatively-charged encapsulated particles into positively-charged encapsulated particles.

In one embodiment, useful cationic polymers can comprise cationic cellulose derivatives, such as those available under the trademark Ucare, and quaternized gums, such as quaternized guar gums available under the trademark Jaguar (Rhodia), polyethylene imine, such as those available commercially under the trademark Lupasol (BASF), cationic polyacrylates and acrylamides, gelatine and quaternized protein hydrolysates, and quaternized amino silicones.

Other cationic compounds that can be used include the polyquaternium materials which have a plurality of quaternary ammonium groups, polymeric species such as diallyl dimethyl ammonium chloride/acrylamide polymers, for example, those available under the trademark Merquat (Nalco), and copolymers of vinyl pyrrolidone and quaternized dimethylaminoalkyl methacrylate, for example, those available under the trademark Gafquat HS 50 and HS 100 (ISP).

Optionally, the surface properties of the encapsulated particles can be altered by incorporating different monomers and/or oligomers with desired functionalities. Examples of monomers with carboxylic groups include acrylic acid, methacrylic acid, crotonic acid, 2-ethylacrylic acid, 2-pentenoic acid, 4-pentenoic acid, 2-propylacrylic acid, 2-octenoic acid, 3-vinylbenzoic acid, 4-vinylbenzoic acid, trans-3-benzoylacrylic (4-oxo-4-phenyl-2-butenoic) acid, 2-bromoacrylic acid, 2-bromomethyl-acrylic acid, 10-undecenoic acid, palmitoleinic acid, fumaric acid, and maleic acid.

Examples of monomers with amino groups include methacrylamide, N-methyl methacrylamide, N-(2-methacryloyloxyethyl)ethyleneurea, and 3-dimethylaminopropyl)methacrylamide.

Optionally, the surface properties of the encapsulated particles can be altered by using different initiators with desired functionalities. Examples of initiators include 4,4'-azobis(4-cyanovaleric acid), 2,2'-azobis(2-methylpropionamidine) dihydrochloride, 2,2'-azobis[2-(2-imidazolin-2-yl)propane]dihydrochloride, 2,2'-azobis[2-(2-imidazolin-2-yl)propane]disulfate dehydrate, 2,2'-azobis[N-(2-carboxyethyl)-2-methylpropionamidine]hydrate, 2,2'-azobis[2-(2-imidazolin-2-yl)propane], 2,2'-azobis(1-imino-1-pyrrolidino-2-ethylpropane)dihydrochloride, and 2,2'-azobis[2-methyl-N-(2-hydroxyethyl)propionamide.

As mentioned above, the stanchion-encapsulated titanium dioxide is used as a pigment in the paint composition. Although illustrated with regard to titanium dioxide, the ranges, ratios and amounts illustrated are also applicable to stanchion-encapsulated pigments when pigments other than titanium dioxide are used. The pigment contained in the paint composition may be exclusively the stanchion-encapsulated pigment or a combination of the same with other pigments. Titanium dioxide can be stanchion-encapsulated or the various other pigments can be stanchion-encapsulated. The other pigments in the pigment portion can be so-called premium pigments such as titanium dioxide (rutile and/or anatase forms), zinc oxide, zinc chromate, chrome oxide green, phthalocyanine green, phthalocyanine blue, iron oxide (FeO, $Fe_2O_3$), etc., but are not limited thereto. The other pigments may also include the so-called extender pigments such as silicon dioxide, calcium carbonate, kaolin, etc. The amount of the stanchion-encapsulated pigment, such as titanium dioxide in the pigment portion is not particularly limited and is generally within the range of 1% to 100%. In some embodiments, the amount of stanchion-encapsulated titanium dioxide is at least 10%, usually at least 20%, and often at least 30% of the total weight of the pigment. In other embodiments, the amount of stanchion-encapsulated titanium dioxide is not greater than 99%, often not greater than 95%, in other cases not greater than 90%, and sometimes not greater than 80% of the total weight of the pigment. More commonly the amount of stanchion-encapsulated titanium dioxide is within the range of 20% to 95%, such as 30% to 90%, or even 40% to 70%, by weight based on the total amount of pigment.

The paint composition additionally contains binder, additive and a liquid carrier. The liquid carrier is usually water optionally with water-miscible organic solvents; though oil can also be used as the liquid carrier. The pigment and binder are typically dispersed in the liquid carrier, i.e., they typically are solids. The additive can be dissolved in the carrier, dispersed in the carrier, or a combination of both.

The binder can be any binders known in the paint arts. Typically the binder is one or more kinds of polymer that can coalesce to form a film. Examples of binders include acrylics, polyvinyl acetates, polyurethanes, polyesters, and epoxy resins. Acrylics include any polymer made from an acrylic acid ester, such as methacrylate, methyl methacrylate, etc. One or more co-monomers may be included in forming the acrylic polymer. Such co-monomers include acrylic acid and vinyl monomers such as styrene. Another kind of binder is an alkyd resin, which is normally used in conjunction with an oil as the liquid carrier.

The amount of binder in the paint composition can vary significantly as is well known in the art. Typically the binder and pigment together are 20% to 60% by volume of the paint composition. Higher quality water-based paint compositions generally have a higher percent of binder and pigment (the main solids content), such as 30% to 50% by volume, in comparison to lower quality paint compositions, which may have 20% to 30% by volume of binder and pigment.

The relative amount of pigment to binder, which is usually expressed as the Pigment Volume Concentration of "PVC," can vary widely as is known in the art. For clarity, PVC refers to the percent, by volume, of the pigment in comparison to the total pigment and binder. Flat paints generally have a higher PVC value, such as 35%-80%, while gloss and semi-gloss paints have a lower PVC value, such as 15%-30%. Such variations are well known in the art.

The paint composition also contains an additive. Additives are well known in the art and serve a variety of purposes. Generally more than one additive is included the paint composition. Typical additives include one or more of the following: viscosity modifying agents, surfactants, anti-foaming agents, pH modifiers, biocides, fungicides, plasticizers, drying agents, UV stabilizers, anti-skinning agents, and adhesion promoters. Often the paint composition will contain one or more surfactants to serve as pigment dispersants or anti-foaming agent, and a viscosity modifying agent such as an organic solvent (thinner).

Additives are usually included at low levels less than 15% by weight, or even less than 10% by weight or from 0% to 5% by weight. Additives exert an effect on the properties or performance of the paint composition.

Additives can be single function, multiple function or synergistic. Additives can include agents to inhibit skinning, sag, settling, float, flood, corrosion, foaming or other property. Anti-skinning agents, by way of illustration, can include materials such as methyl ethyl ketoxime, butyraldoxime, cyclohexanone oxime and phenanthroline.

Anti-foaming agents can include pine oil, dibutyl phosphates, alcohols with carbon length of about 5 to 20, mineral oils, silicone oils, silicas, and silicone polymers. Anti-foaming agents can also include calcium and magnesium salts, glycerides, organic acids and esters, and amide wax dispersions.

Dispersion aids can include polyacrylamides, phosphates, polyamines, amino alcohols, polyalcohols, organic polyacid salts and inorganic alkalis.

Anti-float agents can include metallic oxides such as aluminum oxide, various calcium carbonates, including precipitated calcium carbonates and kaolin clays.

Coalescence additives can include ether alcohols, ester-ethers of polyols, pine oils and the like.

Settling additives can include polyamides, calcium carbonate, soya lecithin, and modified clays.

Rheology modifiers can include castor oil derivatives, polyesters, silicates and polymerized oils, polysaccharides, methyl cellulose derivatives, polyacrylic acids, polyacrylates and various clays.

The paint composition can be made using known techniques. In general the pigment portion is dispersed in the liquid carrier, typically water or water-based (i.e., water and a water-miscible organic solvent such as an alcohol or polyol) by milling and/or mixing. The carrier may be pre-mixed with an additive such as a surfactant, biocide, etc. After the pigment portion is dispersed in one or more steps, then the binder is typically added and mixed into the dispersion composition. Additives can be incorporated in these steps or in separate steps before or after the pigment and binder additions. Final adjustments, such as for pH or color tint, etc., can be also be made after binder incorporation, if desired.

The paint can then be stored in bulk or in individual units such as 1 gallon buckets. The paint may be used as a base paint to which is later added further colorant or pigment, etc., or it may be applied itself as the final paint composition.

The invention will now be described with reference to the following non-limiting examples.

EXAMPLES

Example 1: Stanchion Encapsulation of Titanium Dioxide

Preparation of $TiO_2$ suspension: To a pre-dispersion reactor was added 159 grams of de-ionized water at room temperature, followed by addition of 0.9 grams of sodium polyphosphate under agitation. After mixed for 10 min, 91.3 grams of titanium dioxide powder (Ti-Pure R796+, available from DuPont) was added to the reactor with continued agitation. The pH of the suspension was adjusted to 9.6 with 10% sodium hydroxide solution. The suspension was then homogenized at 10,000 rpm with a homogenizer from Polytron for 3 min, and the $TiO_2$ particle size was then analyzed with a Malvern Zetasizer available from Malvern Instruments Ltd., Enigma Business Park, Grovewood Road, Worcestershire, WR14 1XZ, United Kingdom.

Encapsulation: To a reactor was added 498 grams of De-ionized water, followed by 0.19 grams of sodium dodecyl sulfate (SDS, available from Sigma Aldrich) under agitation with a three blade propeller. After mixing for 10 minutes, the $TiO_2$ suspension prepared above was transferred into this reactor. The reactor was then purged with nitrogen at a flow rate of 300 ml/min. To the reactor was added 91.3 grams of methyl methacrylate (MMA), followed by 0.9 grams of potassium persulfate (KPS), both available from Sigma Aldrich. The reactor temperature was ramped from room temperature to 65° C. over 90 minutes at a rate of 0.44° C./min, and then was held at 65° C. for 8 hours to complete. The agitation speed was controlled at 275 rpm during this reaction period. The content of the reactor was then cooled at a rate of 1° C. per minute.

Example 2: Flat Paint Compositions

A conventional flat paint composition was made having the following ingredients (see Table 1).

TABLE 1

| Material | Chemical Name or Suppliers | Formula Pounds | Formula Gallons | Solids Pounds | Solids Gallons |
|---|---|---|---|---|---|
| Propylene Glycol antifreeze (Solvent) | BASF | 30.00 | 3.48 | 0.00 | 0.00 |
| Water | | 80.00 | 9.60 | 0.00 | 0.00 |
| AMP 95 pH Modifier (multifunctional neutralizer) | (2-amino-2-methyl-1-propanol), The Dow Chemical Company | 1.50 | 0.19 | 0.00 | 0.00 |
| TKPP (wetting and dispersing acid) | Tetrapotassium Pyrophosphate, Chem One Ltd. | 1.00 | 0.05 | 1.00 | 0.05 |
| TAMOL 731 (hydrophobically modified scale inhibitor and pigment dispersant) | Polycarboxylate, sodium salt, The Dow Chemical Company | 11.00 | 1.34 | 2.75 | 0.35 |
| TRITON N101 (nonionic surfactants) | Polyoxyethylene branched nonylcyclohexyl ether, The Dow Chemical Company | 1.50 | 0.18 | 1.50 | 0.24 |
| Canguard 327 (preservative) | The Dow Chemical Company | 1.00 | 0.12 | 0.00 | 0.00 |
| Mix at 2000 RPM for 10 Min | | | | | |
| Rhodaline 643 (defoamer) | Solvay - Rhodia | 1.50 | 0.18 | 1.50 | 0.12 |
| Dupont 746 $TiO_2$ slurry | Dupont | 343.00 | 17.68 | 262.40 | 8.00 |

TABLE 1-continued

| Material | Chemical Name or Suppliers | Formula Pounds | Gallons | Solids Pounds | Gallons |
|---|---|---|---|---|---|
| TALC | | 100.00 | 4.42 | 100.00 | 4.42 |
| calcium carbonate | | 136.80 | 6.06 | 136.80 | 6.06 |
| | Grind to 5 Then Add (speed 8000) reduce speed to 1000 RPM Let Down | | | | |
| Encor 379G (high molecular weight polymer that delivers very high scrub resistance and durability) | Arkema Coating Resins | 398.00 | 44.22 | 218.90 | 22.72 |
| AMP 95 pH Modifier | (2-amino-2-methyl-1-propanol), The Dow Chemical Company | 1.00 | 0.13 | 0.00 | 0.00 |
| Rhodaline 643 | Solvay - Rhodia | 1.50 | 0.18 | 1.50 | 0.18 |
| TEXANOL (coalescent) | Eastman Chemical Company | 8.95 | 1.13 | 0.00 | 0.00 |
| WATER | | 83.20 | 9.99 | 0.00 | 0.00 |
| ACRYSOL RM825 (non-ionic rheology modifier) | The Dow Chemical Company | 9.00 | 1.03 | 2.25 | 0.22 |
| TOTALS | | 1208.95 | 100.00 | 728.60 | 42.38 |

Paint formulation adds most wet materials (solvent), water, multifunctional neutralizer, wetting and dispersing aid, scale inhibitor and pigment dispersant), nonionic surfactants and preservative) first and mix for 10 minutes. Pigments (talc, carbonate, $TiO_2$) and defoamer are ground and mixed. Letdown or rheology modifiers are made next and added. Four additional Paint compositions were also made using the above formula, but with a change to the titanium dioxide pigment. Specifically 10%, 20%, 30%, and 40% of the titanium dioxide was replaced with stanchion-encapsulated titanium dioxide having a 50% polymer-50% titanium dioxide content made a process similar to Example 1. These five paint composition are summarized in Table 2 below relative to the titanium dioxide content.

By off-setting the reduction in titanium oxide with the corresponding volume of stanchion-encapsulated titanium dioxide, the PVC for each paint composition was the same, namely 44.86%. But the actual amount of $TiO_2$ went down as the amount of stanchion-encapsulated titanium dioxide went up. Paint E, for example, has 20% less actual $TiO_2$ than the basic comparison Paint A.

Example 3: Testing of Flat Paint Compositions

The above paint compositions were tested for gloss according to ASTM D523-14 and the results are shown in Table 3 below.

TABLE 2

| | Formula | | Solids | |
|---|---|---|---|---|
| | Pounds | Gallons | Pounds | Gallons |
| Paint A - 100% $TiO_2$ | | | | |
| Dupont 746 $TiO_2$ slurry | 343.00 | 17.68 | 262.40 | 8.00 |
| Paint B - 90% $TiO_2$ | | | | |
| Dupont 746 $TiO_2$ slurry | 308.70 | 15.91 | 236.16 | 7.20 |
| Encapsulated 50-50 | 41.50 | 4.33 | 12.10 | 0.80 |
| Paint C - 80% $TiO_2$ | | | | |
| Dupont 746 $TiO_2$ slurry | 274.40 | 14.14 | 209.92 | 6.40 |
| Encapsulated 50-50 | 83.00 | 8.66 | 24.20 | 1.60 |
| Paint D - 70% $TiO_2$ | | | | |
| Dupont 746 $TiO_2$ slurry | 240.10 | 12.38 | 183.68 | 5.60 |
| Encapsulated 50-50 | 124.50 | 12.99 | 36.30 | 2.40 |
| Paint E - 60% $TiO_2$ | | | | |
| Dupont 746 $TiO_2$ slurry | 205.80 | 10.61 | 157.44 | 4.80 |
| Encapsulated 50-50 | 166.00 | 17.32 | 48.41 | 3.20 |

TABLE 3

| | FLAT 50-50 - white base | | | | | | |
|---|---|---|---|---|---|---|---|
| | % Encapsulate | Gloss | | | | | |
| | 50-50 | 20 | 20 Δs | 60 | 60 Δs | 85 | 85 Δs |
| Paint A | 0% | 1.4 | 0.0 | 3.9 | 0.1 | 24.8 | 0.1 |
| Paint B | 10% | 1.4 | 0.1 | 4.1 | 0.0 | 24.8 | 0.1 |
| Paint C | 20% | 1.4 | 0.0 | 4.2 | 0.0 | 24.1 | 0.4 |
| Paint D | 30% | 1.4 | 0.0 | 4.3 | 0.0 | 23.8 | 0.3 |
| Paint E | 40% | 1.4 | 0.0 | 4.4 | 0.0 | 24.1 | 0.3 |

The testing shows no significant change in gloss despite the reduction in total $TiO_2$.

The paint compositions were also tested for L*a*b* white and black.

Color is related to perception and therefore measured or specified in terms of color space. A commonly used system is the CIE L*a*b* system. This is based on the idea of color opposites.

L—measure of luminance and varies from 100 for perfect white to 0 for perfect black.
  a: redness to greenness.
  b—yellowness to blueness.
The results are summarized in Table 4 below.

TABLE 4

FLAT 50-50 - base

| | % Encapsulate 50-50 | L*a*b* white | | | L*a*b* black | | | Hide |
|---|---|---|---|---|---|---|---|---|
| Paint A | 0% | 97.70 | −0.95 | 2.63 | 97.11 | −1.23 | 1.99 | 99.40 |
| Paint B | 10% | 97.66 | −0.99 | 2.60 | 97.40 | −1.07 | 2.35 | 99.73 |
| Paint C | 20% | 97.60 | −0.96 | 2.63 | 97.38 | −1.05 | 2.41 | 99.77 |
| Paint D | 30% | 97.47 | −0.99 | 2.71 | 96.58 | −1.31 | 1.80 | 99.09 |
| Paint E | 40% | 97.37 | −0.99 | 2.66 | 96.36 | −1.28 | 1.71 | 98.96 |

The results show insignificant changes in the paint quality. This is surprising, especially for Paint E as the expected result would have been a decrease in hide. Paint E has the highest amount of encapsulate. It is replacing white $TiO_2$. At this level (40%) and with Paint D at 30% replacing a significant amount of $TiO_2$ there is an inflection point at which L* and Hide start to relatively decrease slightly even as additional amounts of Encapsulate (stanchion encapsulated $TiO_2$) are added. This is believed attributable to a greater and greater percentage of $TiO_2$ mass being displaced. There is a point at which addition of additional stanchion encapsulated $TiO_2$ does not overcome the deficit in the whiteness attribute of the mass of $TiO_2$ being displaced. There is a optimized range of stanchion encapsulated $TiO_2$ addition up to about 40%, above which there is a slight decrease in L* and Hide, on a relative basis, with further addition. It then takes a relatively larger proportion of addition to obtain further improvement in L* and Hide. Though economics might justify such higher loadings, the slight decrease in L* and Hide must be taken into consideration.

Hiding power and tinting strength are two optical properties used to describe the light-scattering efficiency of a white pigment. While hiding power is a measure of the ability of $TiO_2$ to opacify a white paint film, tinting strength describes its ability to add whiteness and brightness to the color of a tinted paint.

The tinting strength test describes $TiO_2$ light-scattering contribution relative to the light absorbing ability of a colored pigment when a white paint is tinted to about 50% reflectance with the colored pigment.

Example 4: Stanchion-Encapsulated Titanium Dioxide was Used as Replacements in Two Latex Acrylic Formulations The following tests were performed on each sample:
(1) pH
(2) KU Viscosity—ASTM D562
(3) ICI Viscosity—ASTM D4287
(4) Contrast Ratio—ASTM D2805
(5) Reflectance—ASTM E97
(6) Gloss/Sheen—ASTM D523
(7) Block Resistance—ASTM D4946
(8) Tint Strength—2 ounces/gallon Evonik 888-9907 Lamp Black
(9) Color Acceptance—2 ounces/gallon Evonik 888-9907 Lamp Black Tabulated results, formulation and test pigment levels are shown in Tables 5 and 6, as well as FIGS. 15-20.

Acrylic Flat

The contrast ratio value for the 5% replacement level was similar to the control. The 10% and 20% values decreased slightly. The L* values (brightness) decreased as titanium dioxide was removed. Tint strength values decreased as titanium dioxide was removed. No significant differences were noted in gloss values. Reference is made to Table 5 below.

Acrylic Semi Gloss

Stanchion-encapsulated $TiO_2$ was added after the grind for the 5% and 10% titanium dioxide replacement levels. It was necessary to add additional stanchion-encapsulated $TiO_2$ to the grind for the 15% titanium dioxide level because of the lack of liquids necessary for the grind.

Contrast ratio values were similar. The L* values (brightness) increased with the addition of the encapsulated $TiO_2$. Tint strength values decreased as titanium dioxide was removed for the 5% and 10% replacement level. The 15% level was similar to the control. The gloss values decreased slightly with the addition of the encapsulated $TiO_2$ of the invention. Reference is made to Table 6 below.

TABLE 5

Acrylic Flat Results

| | A | B | C | D |
|---|---|---|---|---|
| Encapsulated $TiO_2$, lbs/100 gals. | Control | 52.4 | 104.4 | 208.8 |
| TiO2 Level, lbs/100 gals. | 225 | 213.7 | 202.5 | 180.0 |
| Titanium Dioxide, % Replacement | | 5% | 10% | 20% |
| pH | 9.07 | 9.04 | 8.97 | 8.99 |
| Viscosity, KU | 103 | 105 | 102 | 110 |
| Viscosity, ICI | 1.60 | 1.60 | 1.60 | 2.00 |
| Contrast Ratio, 3 Mils | 0.949 | 0.949 | 0.937 | 0.939 |
| Reflectance | 90.2 | 89.9 | 89.8 | 89.6 |
| CIEL*A*B* Values, 3 Mils | | | | |
| L* | 96.08 | 95.95 | 95.90 | 95.85 |
| a* | −1.07 | −1.09 | −1.10 | −1.04 |
| b* | 1.41 | 1.48 | 1.62 | 1.56 |
| Gloss | | | | |
| Gloss 60 | 5.1 | 4.6 | 4.1 | 3.9 |
| Gloss 85 | 5.2 | 5.2 | 5.1 | 5.5 |
| Tint Strength, Y Value | 40.9 | 40.6 | 40.1 | 39.8 |
| Color Acceptance | Pass | Pass | Pass | Pass |
| DE* Rubbed vs Unrubbed | 0.11 | 0.55 | 0.72 | 0.64 |

TABLE 6

Acrylic Semi Gloss Results

| | A | B | C | D |
|---|---|---|---|---|
| Encapsulated $TiO_2$ Level, lbs/100 gals. | Control | 64 | 127.6 | 191.6 |
| $TiO_2$ Level, lbs/100 gals. | 275 | 261.3 | 247.5 | 233.7 |
| Titanium Dioxide, % Replacement | | 5% | 10% | 15% |
| pH | 8.34 | 8.21 | 8.18 | 8.43 |
| Viscosity, KU | 95 | 108 | 136 | 123 |
| Viscosity, ICI | 0.70 | 0.80 | 1.60 | 1.40 |
| Contrast Ratio, 3 Mils | 0.971 | 0.971 | 0.971 | 0.972 |
| Reflectance | 93.5 | 93.7 | 93.6 | 93.7 |
| CIEL*A*B* Values, 3 Mils | | | | |
| L* | 97.42 | 97.52 | 97.51 | 97.52 |
| a* | −1.07 | −1.08 | −1.03 | −1.04 |
| b* | 0.84 | 0.84 | 0.86 | 0.81 |
| Gloss | | | | |
| Gloss 20 | 24.7 | 21.4 | 20.8 | 13.7 |
| Gloss 60 | 68.5 | 63.6 | 61.4 | 52.6 |
| Tint Strength, Y Value | 48 | 47.6 | 47.2 | 48.0 |

TABLE 6-continued

Acrylic Semi Gloss Results

|  | A | B | C | D |
|---|---|---|---|---|
| Color Acceptance | Pass | Pass | Pass | Pass |
| DE* Rubbed vs Unrubbed | 0.55 | 0.26 | 0.27 | 0.79 |

Example 5: Measurement of Stanchions

The dimension of stanchions and the average number of stanchions per pigment particle of encapsulated $TiO_2$ particles from Example 1 were measured from TEM images with method described previously. The measured average length and width of the stanchions were 41 nm and 80.1 nm, respectively, and the average number of stanchions per particle was 3.6 (as shown in Table 7 and Table 8.

TABLE 7

Length and Width of Stanchions

| Stanchion ID | Length (nm) | Width (nm) |
|---|---|---|
| 1 | 100.0 | 110.0 |
| 2 | 50.0 | 100.0 |
| 3 | 70.0 | 110.0 |
| 4 | 40.0 | 50.0 |
| 5 | 100.0 | 100.0 |
| 6 | 66.7 | 133.0 |
| 7 | 66.0 | 100.0 |
| 8 | 66.0 | 80.0 |
| 9 | 20.0 | 53.0 |
| 10 | 87.0 | 87.0 |
| 11 | 53.0 | 93.0 |
| 12 | 20.0 | 133.0 |
| 13 | 33.0 | 90.0 |
| 14 | 18.5 | 120.0 |
| 15 | 18.5 | 37.0 |
| 16 | 14.8 | 55.5 |
| 17 | 31.6 | 52.6 |
| 18 | 34.2 | 52.6 |
| 19 | 15.8 | 39.5 |
| 20 | 13.2 | 50.0 |
| 21 | 13.2 | 34.2 |
| 22 | 13.1 | 39.5 |
| 23 | 20.0 | 50.0 |
| 24 | 20.0 | 150.0 |
| 25 | 20.0 | 40.0 |
| 26 | 60.0 | 80.0 |
| 27 | 30.0 | 75.0 |
| 28 | 14.8 | 40.7 |
| 29 | 53.3 | 113.0 |
| 30 | 66.7 | 133.0 |
| Average = | 41.0 | 80.1 |

TABLE 8

Number of Stanchions

| Particles ID | Number of Stanchions |
|---|---|
| 1 | 5 |
| 2 | 3 |
| 3 | 5 |
| 4 | 2 |
| 5 | 4 |
| 6 | 5 |
| 7 | 4 |
| 8 | 3 |
| 9 | 3 |
| 10 | 2 |
| 11 | 3 |
| 12 | 3 |
| 13 | 4 |
| 14 | 3 |
| 15 | 4 |
| 16 | 3 |
| 17 | 6 |
| 18 | 4 |
| 19 | 5 |
| 20 | 3 |
| 21 | 3 |
| 22 | 2 |
| 23 | 3 |
| 24 | 3 |
| 25 | 4 |
| 26 | 3 |
| 27 | 4 |
| 28 | 4 |
| 29 | 4 |
| 30 | 3 |
| Average = | 3.6 |

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A paint composition comprising a liquid carrier, binder, pigment, and additive,
    wherein said pigment comprises particles of a stanchion-encapsulated pigment that is titanium dioxide and having an average of 0.2 to 6 stanchions per particle of titanium dioxide and an average stanchion length is within the range of 10 to 500 nm,
    wherein the average stanchion lengths of the encapsulated pigment ranges from 0.01 d to 3.5 d where "d" is the encapsulated pigment diameter,
    wherein the stanchion-encapsulated titanium dioxide contains a polymeric encapsulating material that comprises a polymer selected from the group consisting of polyacrylate, polymethacrylate, polyalkyl(meth)acrylate, and combinations thereof,
    wherein each stanchion protrudes at least two times the thickness of the encapsulating material and connects two or more particles together, and
    wherein the stanchion and polymeric encapsulating material are the same material.

2. The paint composition according to claim 1, wherein said stanchion-encapsulated pigment is titanium dioxide and comprises 1% to 100%, by weight, of all pigments in said paint.

3. The paint composition according to claim 1, wherein said stanchion-encapsulated titanium dioxide is 25% to 85%, by weight, titanium dioxide.

4. The paint composition according to claim 1, wherein the pigment volume concentration (PVC) is within the range of 15% to 80%.

5. The paint composition according to claim 4, wherein said stanchion-encapsulated titanium dioxide is 20% to 95%, by volume, of said pigment.

6. The paint composition according to claim 1, wherein said carrier is water.

7. The paint composition according to claim 1, wherein said binder is selected from the group consisting of acrylics, polyvinyl acetates, polyurethanes, polyesters, epoxy resins, and combinations of two or more.

8. The paint composition according to claim 1, wherein said additive is at least one selected from the group consisting of viscosity modifying agents, surfactants, antifoaming agents, pH modifiers, biocides, fungicides, plasticizers, drying agents, UV stabilizers, anti-skinning agents, and adhesion promoters.

* * * * *